(12) United States Patent
Haizaki et al.

(10) Patent No.: US 9,970,361 B2
(45) Date of Patent: May 15, 2018

(54) ENGINE CONTROL APPARATUS

(71) Applicant: MAZDA MOTOR CORPORATION, Hiroshima (JP)

(72) Inventors: Yukio Haizaki, Hiroshima (JP); Naohiro Yamaguchi, Hiroshima (JP); Kazutoyo Watanabe, Higashihiroshima (JP); Yasunori Matoba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 65 days.

(21) Appl. No.: 15/023,542

(22) PCT Filed: Aug. 6, 2015

(86) PCT No.: PCT/JP2015/072352
§ 371 (c)(1),
(2) Date: Mar. 21, 2016

(87) PCT Pub. No.: WO2016/031518
PCT Pub. Date: Mar. 3, 2016

(65) Prior Publication Data
US 2016/0215705 A1    Jul. 28, 2016

(30) Foreign Application Priority Data
Aug. 29, 2014    (JP) ................................. 2014-175380

(51) Int. Cl.
*F02D 13/02*    (2006.01)
*F02D 41/00*    (2006.01)
(Continued)

(52) U.S. Cl.
CPC ..... *F02D 13/0215* (2013.01); *F02D 13/0261* (2013.01); *F02D 37/02* (2013.01);
(Continued)

(58) Field of Classification Search
CPC ............. F02D 13/0215; F02D 13/0261; F02D 41/0002; F02D 41/0087; F02D 37/02;
(Continued)

(56) References Cited

U.S. PATENT DOCUMENTS 5,481,461 A * 1/1996 Miyamoto .............. F01L 1/267
123/198 F
6,138,636 A   10/2000 Kohno et al.
(Continued)

FOREIGN PATENT DOCUMENTS

CN     1375625 A     10/2002
JP     H05-332172 A  12/1993
(Continued)

OTHER PUBLICATIONS

International Search Report issued in PCT/JP2015/072352; dated Nov. 2, 2015.
(Continued)

*Primary Examiner* — Sizo Vilakazi
*Assistant Examiner* — Brian Kirby
(74) *Attorney, Agent, or Firm* — Studebaker & Brackett PC

(57) ABSTRACT

In response to a switching demand from an all-cylinder operation to a reduced-cylinder operation, the amount of air to be taken into each of cylinders 2A to 2D is made larger than the amount of air during the all-cylinder operation in a normal state. Preparatory control of changing the ignition timing of ignition device to a timing on the retard side with respect to the ignition timing during the all-cylinder operation in the normal state is executed. After termination of the preparatory control, the reduced-cylinder operation is started. During execution of the preparatory control, the valve closing timing of an exhaust valve 9 is changed to a timing on the advance side with respect to the valve closing (Continued)

timing thereof during the all-cylinder operation in the normal state so as to reduce the amount of internal EGR gas in at least a part of an operating range C.

6 Claims, 13 Drawing Sheets

(51) Int. Cl.
  *F02D 37/02* (2006.01)
  *F02P 5/145* (2006.01)
  *F02P 5/04* (2006.01)
  *F02P 5/15* (2006.01)
  *F02D 13/06* (2006.01)
  *F02D 17/02* (2006.01)

(52) U.S. Cl.
  CPC ....... *F02D 41/0002* (2013.01); *F02D 41/006* (2013.01); *F02D 41/0087* (2013.01); *F02P 5/045* (2013.01); *F02P 5/145* (2013.01); *F02P 5/1504* (2013.01); *F02D 13/06* (2013.01); *F02D 17/02* (2013.01); *F02D 2041/001* (2013.01); *F02D 2041/0012* (2013.01); *F02D 2250/21* (2013.01); *F02P 5/1508* (2013.01); *Y02T 10/18* (2013.01); *Y02T 10/42* (2013.01); *Y02T 10/47* (2013.01)

(58) Field of Classification Search
  CPC ............... F02D 41/006; F02D 2250/21; F02D 2041/0012; F02D 2041/001; F02D 17/02; F02D 13/06; F02P 5/1504; F02P 5/045; F02P 5/145; F02P 5/1508; Y02T 10/42; Y02T 10/18; Y02T 10/47
  USPC ...................................... 123/481, 348, 198 F
  See application file for complete search history.

(56) References Cited

U.S. PATENT DOCUMENTS

| | | | | |
|---|---|---|---|---|
| 6,170,474 | B1* | 1/2001 | Israel | F02D 13/04 123/568.14 |
| 6,244,258 | B1* | 6/2001 | Akiyama | F02D 13/06 123/198 F |
| 6,360,713 | B1* | 3/2002 | Kolmanovsky | F02D 17/02 123/295 |
| 6,499,449 | B2* | 12/2002 | Michelini | F02D 37/02 123/198 F |
| 6,615,804 | B2* | 9/2003 | Matthews | F02D 17/02 123/198 F |
| 6,619,267 | B1* | 9/2003 | Pao | F02B 75/22 123/184.25 |
| 6,817,336 | B2* | 11/2004 | Glugla | F02B 75/22 123/198 F |
| 7,835,848 | B1* | 11/2010 | Rollinger | F01L 1/34 123/198 F |
| 8,150,605 | B2* | 4/2012 | Doering | F02D 13/06 123/198 F |
| 8,498,797 | B2* | 7/2013 | Moriya | F01L 1/344 123/198 F |
| 2002/0129789 | A1 | 9/2002 | Furukawa et al. | |
| 2004/0255905 | A1* | 12/2004 | Bauerle | F02D 17/02 123/396 |
| 2009/0222197 | A1 | 9/2009 | Moriya | |
| 2010/0211297 | A1* | 8/2010 | Doering | F02D 13/06 701/112 |
| 2011/0313643 | A1 | 12/2011 | Lucatello et al. | |
| 2012/0167848 | A1 | 7/2012 | Moriya | |
| 2013/0317725 | A1* | 11/2013 | Brennan | F02D 41/0087 701/105 |

FOREIGN PATENT DOCUMENTS

| | | |
|---|---|---|
| JP | H10-103097 A | 4/1998 |
| JP | H11-336575 A | 12/1999 |
| JP | 2012-007611 | 1/2012 |

OTHER PUBLICATIONS

An Office Action issued by Chinese Patent Office dated Oct. 10, 2017, which corresponds to Chinese Patent Application No. 201580001960.2 and is related to U.S. Appl. No. 15/023,542.

* cited by examiner

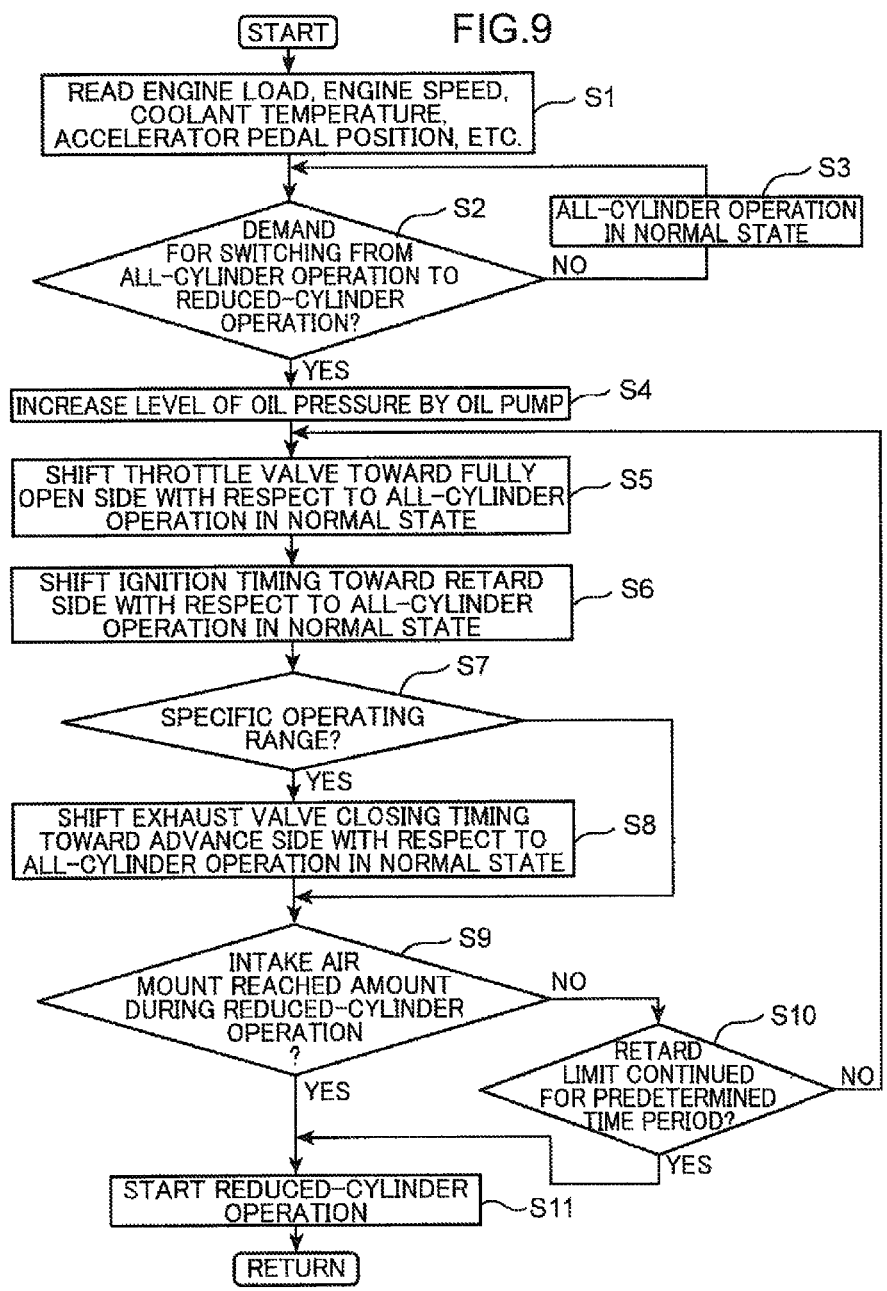

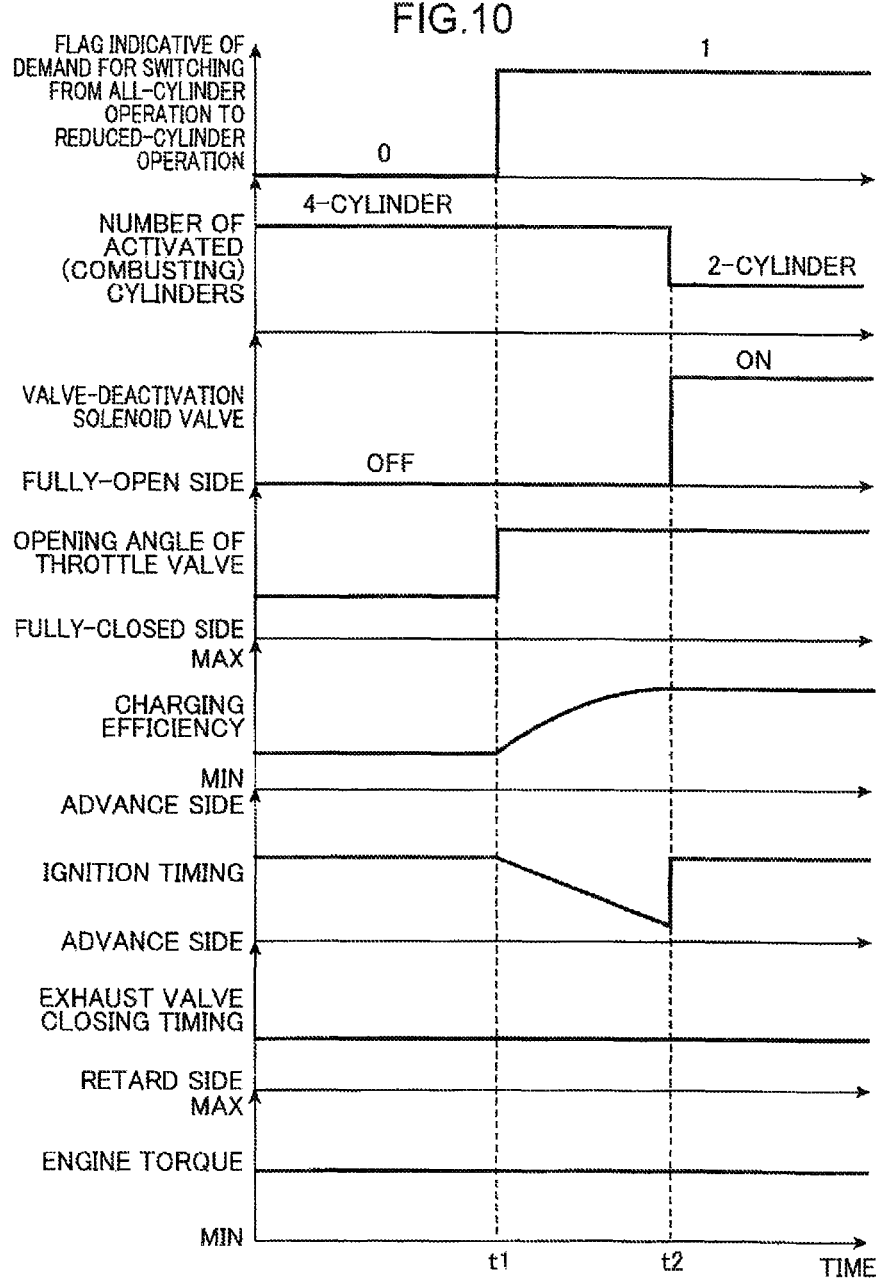

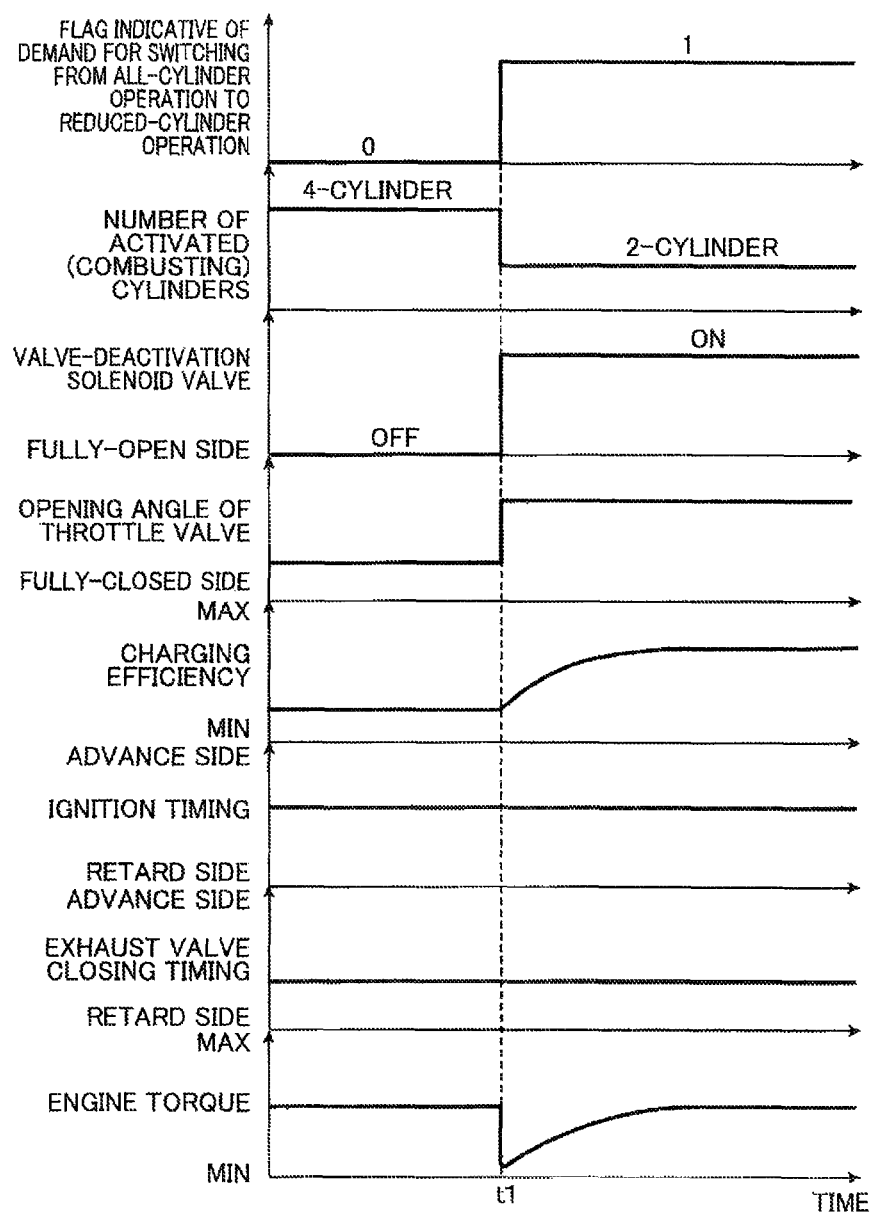

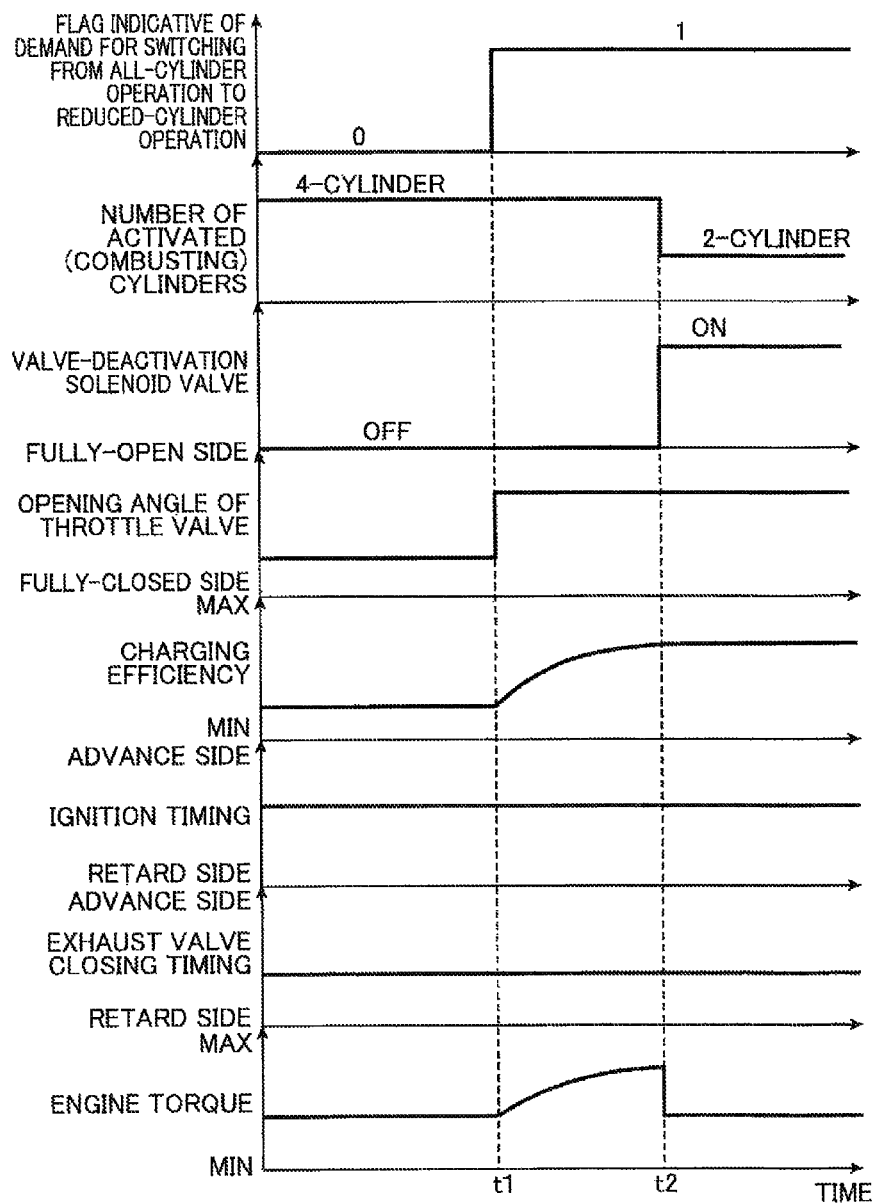

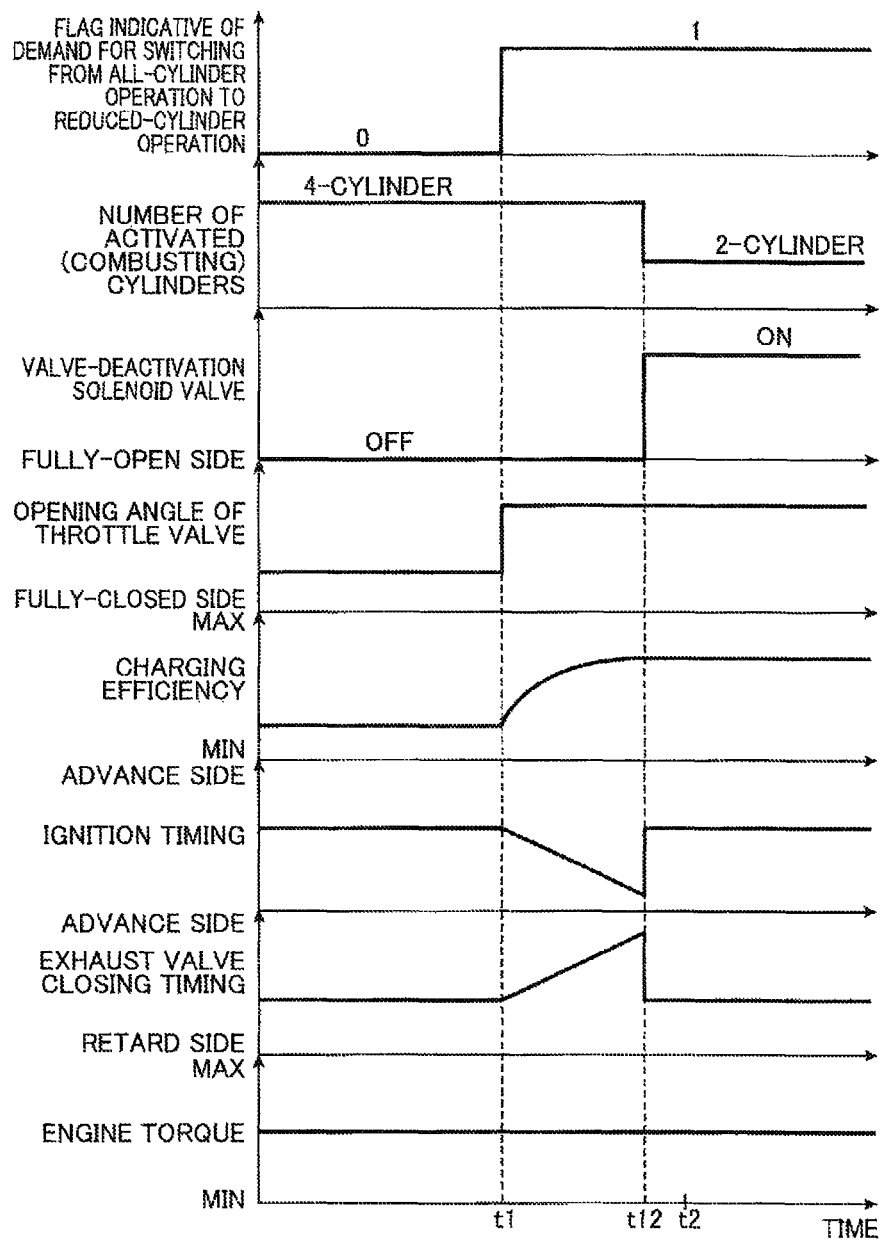

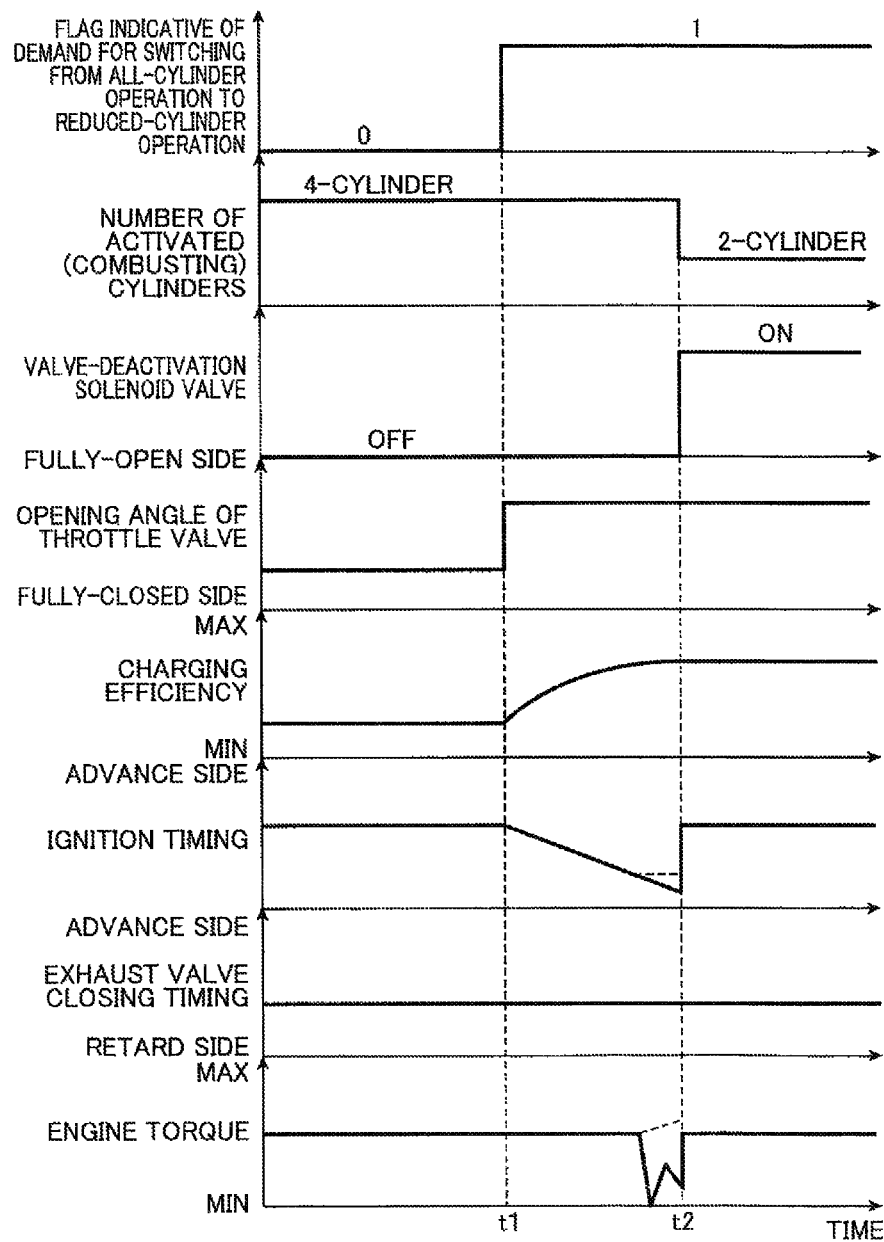

ENGINE CONTROL APPARATUS

TECHNICAL FIELD

The present invention relates to an engine control, apparatus switch-able between an all-cylinder operation in which combustion of an air-fuel mixture is performed in all the cylinders, and a reduced-cylinder operation in which, the combustion in at least one of the cylinders is stopped and the at least one cylinder is deactivated.

BACKGROUND ART

In the field of multi-cylinder engines having a plurality of cylinders, there has heretofore been known a technique, so-called "reduced-cylinder operation" in which a part of the cylinders is deactivated by stopping combustion therein.

During the reduced-cylinder operation, the number of activated cylinders, i.e., the number of output cylinders is reduced, thereby possibly leading to a decrease in power output of the entire engine. Therefore, it is common practice to execute, during the reduced-cylinder operation, a control for increasing an amount of air (intake air amount) to be taken into each of the activated cylinders so as to increase power output of the activated cylinders.

In this case, however, the intake air amount is increased, with a certain delay. Thus, even when, the control for increasing the intake air amount is executed at the time of switching from the all-cylinder operation to the reduced-cylinder operation, the intake air amount does not instantaneously increase, thereby leading to lowering of engine power output i.e. occurrence of torque shock at the time of switching.

In this regard, Patent Literature 1 discloses an apparatus configured to, at the time of switching from an all-cylinder operation to a reduced-cylinder, operation, shift a throttle valve provided in an intake passage communicating with each of the cylinders toward its fully-open side so that the opening angle of the throttle valve comes close to the opening angle during the reduced-cylinder operation, before combustion of a part of the cylinders is stopped so as to increase the amount of air (intake air amount) to be taken into all the cylinders, and then to stop combustion of a part of the cylinders.

In the apparatus disclosed in Patent Literature 1, the amount of air to be taken into each of the cylinders increases before combustion of a part of the cylinders is stopped. This makes it possible to suppress shortage of the intake air amount of the activated cylinders at the time of stopping combustion of the cylinders, namely, at the time of start of the reduced-cylinder operation. However, simply increasing the intake air amount of each of the cylinders before start of the reduced-cylinder operation, namely, in a state that combustion is performed in all the cylinders may increase power output of the entire engine before start of the reduced-cylinder operation. This may also cause torque shock.

CITATION LIST

Patent Literature

Patent Literature 1: Japanese Unexamined Patent Publication No. H11-336575

SUMMARY OF INVENTION

In view of the above, an object of the invention is to provide an engine control apparatus that enables to securely avoid occurrence of torque shock at the time of switching from an all-cylinder operation to a reduced-cylinder operation.

In order to achieve the above object an engine control apparatus according to the invention is an engine control apparatus provided with a plurality of cylinders including intake valves and exhaust valves, an ignition device provided in each of the cylinders and configured to apply ignition energy to an air-fuel mixture in the cylinders, and an intake air amount changing device capable of changing an amount of air to be taken into each of the cylinders. The apparatus is switchable between an all-cylinder operation in which combustion of the air-fuel mixture is performed in all the cylinders, and a reduced-cylinder operation in which combustion in at least one of the cylinders is stopped and the at least one cylinder is deactivated. The apparatus includes a valve deactivation mechanism which switches the intake valve and the exhaust valve of the at least one cylinder between a state that the intake valve and the exhaust valve are openable and closable, and a state that the intake valve and the exhaust valve are kept closed; an exhaust valve closing timing changing device operable to change a valve closing timing of the exhaust valve; and a control device which controls components of an engine including the valve deactivation mechanism, the exhaust valve closing timing changing device, the intake air amount changing device, and the ignition device. The control, device is operative to, in response to a switching demand for switching from the all-cylinder operation to the reduced-cylinder operation, execute a preparatory control of causing the intake air amount changing device to make an amount of air to be taken into each of the cylinders larger than an amount of air during the all-cylinder operation in a normal state in which the switching, demand is not issued, and of changing an ignition timing of the ignition device to a timing on a retard side with respect to an ignition timing during the all-cylinder, operation in the normal state; and after termination of the preparatory control, cause the valve deactivation mechanism to keep the intake valve and the exhaust valve of the at least one cylinder in a closed state, and to stop ignition of the ignition device of the at least one cylinder for starting the reduced cylinder operation. The control device is operative to, during execution of the preparatory control, cause the exhaust valve closing timing changing device to change the valve closing timing of the exhaust valve, to a timing on an advance side with respect to a valve closing timing of the exhaust valve during the all-cylinder operation in the normal state so as to reduce an amount of internal EGR gas remaining in each of the cylinders in at least a part of an operating range.

According to the engine control apparatus of the invention, it is possible to securely avoid occurrence of torque shock at the time of switching from the all-cylinder operation to the reduced-cylinder operation.

BRIEF DESCRIPTION OF DRAWINGS

FIG. 9 is a flowchart illustrating a control process during switching from an all-cylinder operation to a reduced-cylinder operation;

FIG. 10 is a diagram illustrating a timewise change of each parameter when a control in the embodiment of the invention is executed in an operating range other than a specific operating range;

FIG. 11 is a diagram illustrating a timewise change of each parameter when a control as a comparative example is executed in an operating range other than the specific operating range;

FIG. 12 is a diagram illustrating a timewise change of each parameter when a control as another comparative example is executed in an operating range other than the specific operating range;

FIG. 13 is a diagram illustrating a timewise change of each parameter when a control in the embodiment of the invention is executed, in the specific operating range; and FIG. 14 is a diagram illustrating a timewise change of each parameter when a control as a comparative example is executed in the specific operating range.

DESCRIPTION OF EMBODIMENTS (1) Overall Configuration of Engine

Figure 1:
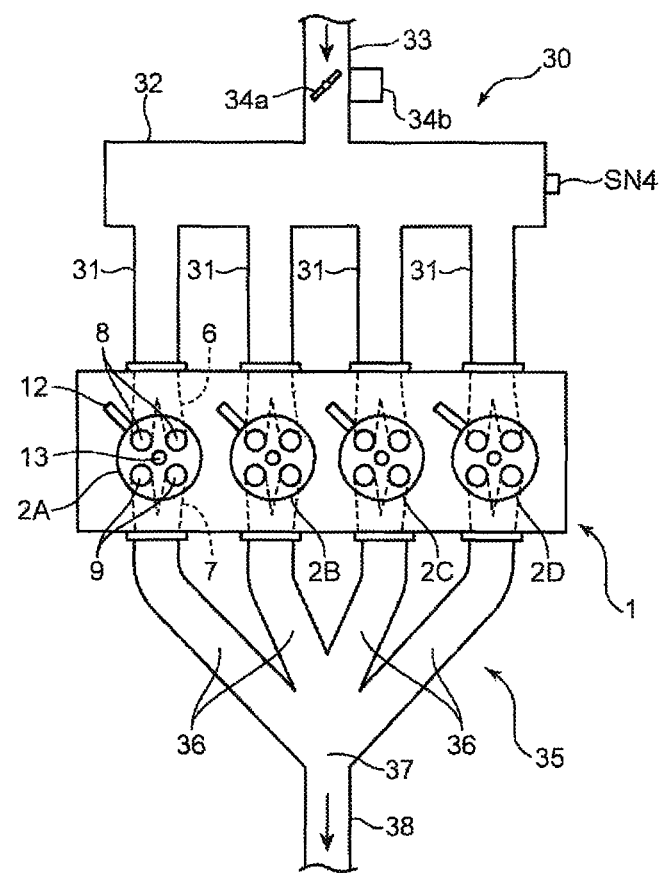
FIG. 1 is a schematic top plan view illustrating an overall configuration of an engine in an embodiment, of the present invention.

FIG. 1 is a schematic diagram illustrating an engine employing an engine control apparatus of the invention. The engine illustrated in FIG. 1 is a four-cycle multi-cylinder gasoline engine mounted to a vehicle body to serve as a running power source. More specifically, this engine is provided with an in-line four-cylinder engine body 1 having four cylinders 2A to 2D arranged side-by-side linearly; an intake passage 30 for introducing air into the engine body 1; and an exhaust passage 35 for discharging exhaust gas produced in the engine body 1.

Figure 2:
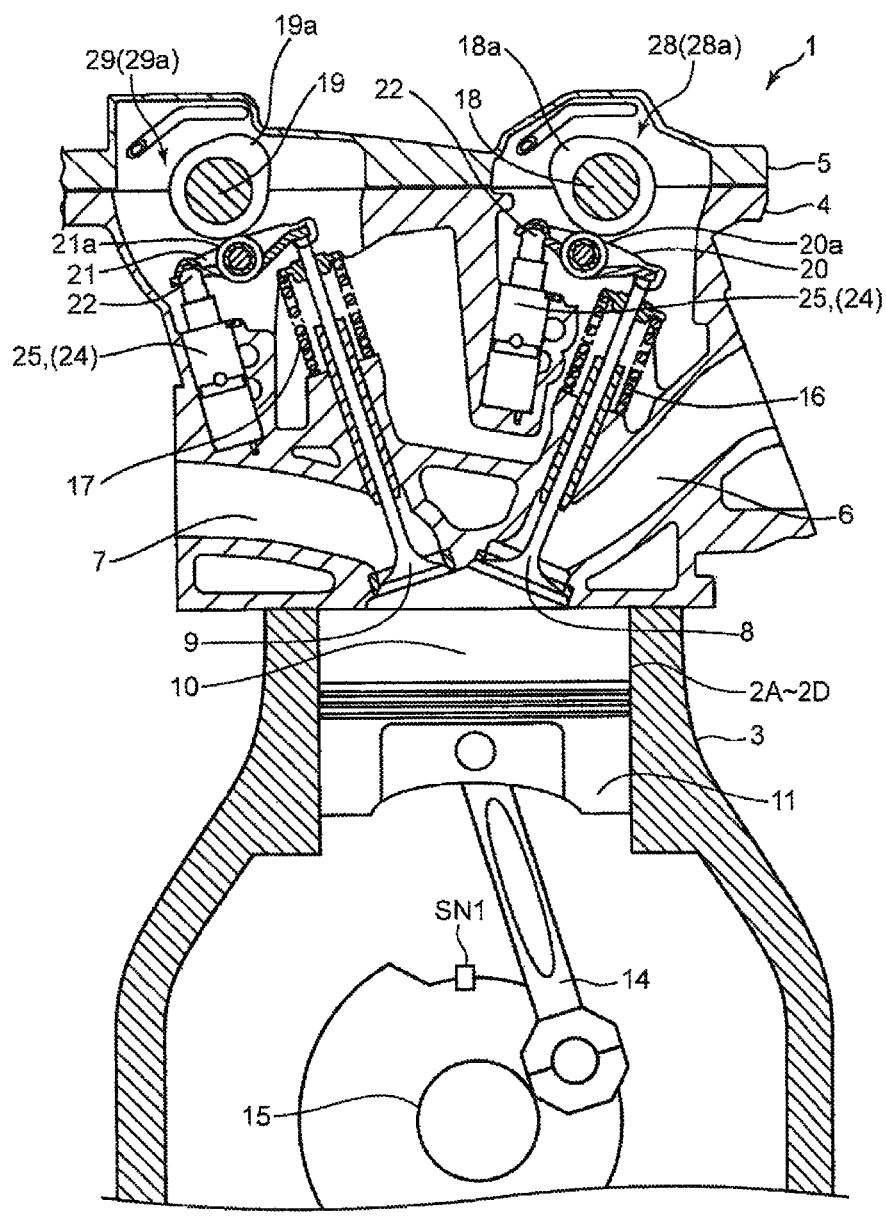
FIG. 2 is a sectional view of an engine body.

FIG. 2 is a sectional view of the engine body 1. As illustrated in FIG. 2, the engine body 1 includes: a cylinder block 3 having the four cylinders 2A to 2D formed therein; a cylinder head 4 provided on an upper side of the cylinder block 3; a earn cap 5 provided on an upper side of the cylinder head 4; and pistons 11 each inserted into a respective one of the cylinders 2A to 2D in a reciprocatingly slidable manner.

A combustion chamber 10 is defined above the piston 11. Gasoline-based fuel injected from an injector 12 (FIG. 1) is supplied to the combustion chamber 10. The supplied fuel is combusted in the combustion chamber 10. The piston 11 is configured to be reciprocatingly moved in an up-down direction while being pushed downwardly by an expansion force arising from the combustion.

The piston 11 is coupled to a crankshaft 15 serving as an output shaft of the engine body 1 via a connecting rod 14. The crankshaft 15 is configured to be rotated about its central axis according to the reciprocating movement of the piston 11.

As illustrated, in FIG. 1, the cylinder head 4 is provided with a plurality of injectors 12 each operable to inject fuel (gasoline) toward an associated one of the combustion chambers 10 of the cylinders 2A to 2D, and a plurality of spark, plugs (ignition device) 13 each operable to ignite an air-fuel mixture, i.e., a mixture of air and fuel injected from an associated one of the injectors 12 by means of spark discharge. In this embodiment, the injector 12 is provided in a number of one per cylinder, i.e., in a number of four in total, and the spark plug 13 is provided in a number of one per cylinder, i.e., in a number of four in total.

In the four-cycle four-cylinder gasoline engine as in this embodiment, the respective associated pistons 11 provided in the cylinders 2A to 2D are moved up and down with a phase difference of 180 degrees in terms of crank angle (180 degrees CA) therebetween. Correspondingly, ignition timings in the successive ones of the cylinders 2A to 2D are set to respective timings whose phases are offset from each other by 180 degrees CA. Specifically, in the order from the left side in FIG. 1, assuming that the cylinder 2A is a first cylinder, the cylinder 2B is a second cylinder, the cylinder 2C is a third cylinder, and the cylinder 2D is a fourth cylinder, ignition is performed in the following order: the first cylinder 2A→the third cylinder 2C→the fourth cylinder 2D→the second cylinder 2B.

The engine in this embodiment is a variable cylinder engine capable of performing a reduced-cylinder operation, i.e., an operation in which two of the four cylinders 2A to 2D are deactivated, and the remaining two cylinders are activated. The above firing order is applied to a normal operation (all-cylinder operation in which all of the four cylinders 2A to 2D are activated) other than the reduced-cylinder operation. On the other hand, during the reduced-cylinder operation, in two of the cylinders which are non-successive in terms of firing order (in this embodiment, the first cylinder 2A and the fourth cylinder 2D), an ignition function of corresponding two of the spark plugs 13 is inhibited, so that ignition is performed in an alternately skipping manner in the above firing order.

As illustrated in FIGS. 1 and 2, the cylinder head 4 has a plurality of intake ports 6 each formed to introduce air (intake air) supplied from the intake passage 30 into an associated one of the combustion chambers 10 of the cylinders 2A to 2D, a plurality of exhaust ports 7 each formed to lead exhaust gas produced in an associated one of the combustion chambers 10 of the cylinders 2A to 2D to the exhaust passage 35, a plurality of intake valves 8 each operable to open and close a combustion-chamber-10-side opening of an associated one of the intake ports 6 so as to control introduction of intake air through the associated intake ports 6, and a plurality of exhaust valves 9 each operable to open and close a combustion-chamber-10-side opening of an associated one of the exhaust ports 7 so as to control discharge of exhaust gas from the associated exhaust ports 7. In this embodiment, the intake valve 8 is provided in a number of two per cylinder, i.e., in a number of eight in total, and the exhaust valve 9 is provided in a number of two per cylinder, i.e., in a number of eight in total.

As illustrated in FIG. 1, the intake passage 30 includes: four independent intake passages 31 communicated, respectively, with the intake ports 6 of the cylinders 2A to 2D; a surge tank 32 commonly connected to respective upstream ends (ends on an upstream side in an intake air flow direction) of the independent intake passages 31; and one intake pipe 33 extending from the surge tank 32 toward the upstream side. A throttle valve 34a is interposed in the intake pipe 33 so as to open and close an internal passage of the intake pipe 33. The intake pipe 33 is provided with a valve actuator 34b for driving the throttle valve 34a. The valve actuator 34b is operable to open and close the throttle valve 34a. When the throttle valve 34a is openably and closably driven by the valve actuator 34b, the amount of air (intake air) to be introduced into the cylinders 2A to 2D through the intake pipe 22 is changed. In the embodiment, the throttle valve 34a functions as an intake air amount changing device for changing the intake air amount of each of the cylinders 2A to 2D.

The exhaust passage 35 includes: four independent exhaust passages 36 communicated, respectively, with the exhaust ports 7 of the cylinders 2A to 2D; a merged portion 37 into which respective downstream ends (ends on a downstream side in an exhaust gas flow direction) of the independent, exhaust, passages 36 are merged; and one exhaust pipe 38: extending from the merged portion 37 toward the downstream side.

(2) Valve Operation Mechanism

Figure 3:
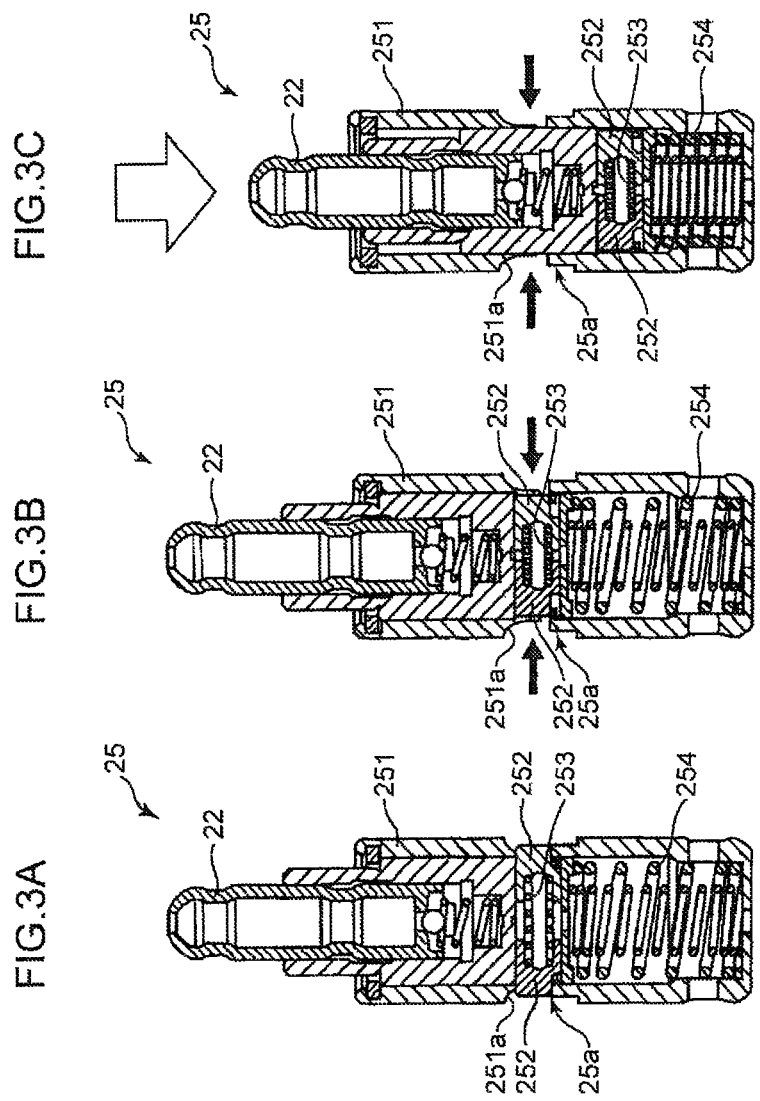
FIG. 3A is a diagram illustrating a valve deactivation mechanism in a situation where a pivot member is in a locked state.
FIG. 3B is a diagram illustrating the valve deactivation mechanism before the pivot member is shifted to an unlocked state.
FIG. 3C is a diagram illustrating the valve deactivation mechanism in a situation where the pivot member is in the unlocked state.

With reference to FIGS. 2 and 3, a mechanism, for opening and closing the intake valves 8 and the exhaust valves 9 will be described in detail below, A group of the intake valves 8 and a group of the exhaust valves 9 are configured to be openably and closably driven, respectively, by a pair of valve operation mechanisms 28, 29 (see FIG. 2) provided in the cylinder head 4, in association with rotation of the crankshaft 15.

The valve operation mechanism 28 for the intake valves 8 includes: return springs 16 each biasing a respective one of the intake valves 8 in a closing direction (in FIG. 2, upwardly); a camshaft 18 configured to be rotated in association with rotation of the crankshaft 15; cam portions 18a provided on the camshaft 18 in an integrally rotatable manner; swing arms 20 each configured to be periodically pushed by a respective one of the cam portions 18a; and pivot members 22 each serving as a swing pivot of a respective one of the swing arms 20.

Similarly, the valve operation mechanism 29 for the exhaust valves 9 includes: return springs 17 each biasing a respective one of the exhaust valves 9 in a closing direction (in FIG. 2, upwardly); a camshaft 19 configured to be rotated in association with rotation of the crankshaft 15; cam portions 19a provided on the camshaft 19 in an integrally rotatable manner; swing arms 21 each configured to be periodically pushed by a respective one of the cam portions 19a; and pivot, members 22 each serving as a swing pivot of a respective one of the swing arms 20.

Each of the intake valves 8 (exhaust valves 9) is openably and closably driven by the valve operation mechanism 28 (29) in the following manner. Upon rotation of the can shaft 18 (19) accompanied by rotation of the crankshaft 15, a cam follower 20a (21a) rotatably provided in an approximately central portion of a corresponding one of the swing arms 20 (21) is periodically pushed downwardly by a corresponding one of the cam portions 18a (19a). Thus, the swing arm 20 (21) is swingingly displaced about a corresponding one of the pivot members 22 supporting one end of the swing arm 20 (21) to serve as a pivot point. Along with the displacement, the other end of the swing arm 20 (21) pushes the intake valve 8 (exhaust valve 9) against a biasing force of a corresponding one of the return springs 16 (17). In this way, the intake valve 8 (exhaust valve 9) is opened. After the intake valve 8 (exhaust valve 9) is moved to an opened position, the intake valve 8 (exhaust valve 9) is returned to a closed position by the biasing force of the return spring 16 (17).

The valve operation mechanism 28 (29) is provided with a variable valve timing mechanism, so called VVT (intake VVTs 28a, exhaust VVTs 29a: exhaust valve closing timing changing device) which changes the opening and closing timings of the intake valves 8 (exhaust valves 9) by changing the phase of the camshaft 18 (19) with respect to the crankshaft 15. The VVT is a well-known device, and description of the detailed structure thereof is omitted herein. In the embodiment, the VVT is of a hydraulic type. The opening timings and the closing timings of the intake valves 8 (exhaust valves 9) are changed according to the level of oil pressure to be supplied thereto. Further, in the embodiment, the opening and closing timings of the intake valves 8 (exhaust valves 9) are changed in a state that tire valve opening time period is kept unchanged.

Each of the pivot members 22 is supported, by a well-known hydraulic lash adjuster (hereinafter abbreviated as "HLA") 24, 25 for automatically adjusting a valve clearance to zero. Among the eight HLAs, two pairs of two HLAs 24 are provided to automatically adjust a valve clearance, respectively, in the second cylinder 2B and the third cylinder 2C located on a central region of the engine body 1 in a cylinder row direction. On the other hand, two pairs of two HLAs 25 are provided to automatically adjust a valve clearance, respectively, in the first cylinder 2A and the fourth cylinder 2D located on both ends of the engine body 1 in the cylinder row direction.

The HLAs 25 for the first and fourth cylinders 2A and 2D have a function of switching between activation and deactivation of the opening-closing movements of the intake valves 8 and the exhaust valves 9 depending on the all-cylinder operation and the reduced-cylinder operation of the engine. Specifically, the HLAs 25 are operable, during the all-cylinder operation of the engine, to activate the opening-closing movements of the intake valves 8 and the exhaust valves 9 of the first and fourth cylinders 2A and 2D. On the other hand, the HLAs 25 are operable, during the reduced-cylinder operation of the engine, to deactivate the opening-closing movements of the intake valves 8 and the exhaust valves 9 of the first and fourth cylinders 2A and 2D in such a manner as to keep each of the intake valves 8 and the exhaust valves 9 in a closed state. As a mechanism for deactivating the opening-closing movements of the intake valves 8 and the exhaust valves 9, each of the HLAs 25 has a valve deactivation mechanism 25a illustrated in FIGS. 3A to 3C. In contrast, each of the HLAs 24 for the second and third cylinders 2B and 2C is devoid of the valve deactivation mechanism 25a, so that each of the HLAs 25 does not have any function of deactivating the opening-closing movements of the intake valves 8 and the exhaust valves 9. In order to distinguish the HLAs 25 from the HLAs 24, each of the HLAs 25 having the valve deactivation mechanism 25a will hereinafter be referred to particularly as S-HLA (abbreviation for Switchable-Hydraulic Lash Adjuster) 25.

The valve deactivation mechanism 25a of the S-HLA 25 includes a bottomed outer casing 251, a pair of lock pins 252, a lock spring 253, and a lost motion spring 254. The outer casing 251 receives therein the pivot member 22 in an axially slidable manner. The paired lock pins 252 are configured to be movable in and out of two through-holes 251a formed in a peripheral wall of the outer casing 251 as oppose to each other to thereby switch the pivot member 22 to a locked state or an unlocked state. The lock spring 253 biases the lock pins 252 radially outwardly of the outer casing 251. The lost motion spring 254 is provided between an inner bottom of the outer casing 251 and a bottom of the pivot member 22 to bias the pivot member 22 upwardly with respect to the outer casing 251.

As illustrated in FIG. 3A, when the lock pins 252 are fitted in the respective through-holes 251a of the outer casing 251, the pivot member 22 is in the locked state in which the pivot member 22 is locked while protruding upwardly. In this locked state, as illustrated in FIG. 2, a top of the pivot member 22 serves as the swing pivot of the swing arm 20 (21). Thus, in this locked state, when the cam portion 18a (19a) pushes the cam follower 20a, (21a) downwardly by rotation of the camshaft 18 (19), the intake valve 8 (exhaust valve 9) is displaced downwardly against the biasing force of the return spring 16 (17) and opened. During the all-cylinder operation in which all of the four, cylinders 2A to 2D are activated, the pivot member 22 is set in the locked state to allow the intake valve 8 (exhaust valve 9) in each of the first and fourth cylinders 2A to be opened and closed.

In order to release the locked state, the paired lock pins 252 are pushed radially inwardly. Then, as illustrated in FIG. 3B, the lock pins 252 are moved in a direction causing them to come closer to each other (radially inwardly of the outer casing 251) against a biasing force of the lock spring 253. Thus, the fitting between corresponding ones of the lock pins 252 and the through-holes 251a of the outer casing 251 is released, and the pivot member 22 is set in the unlocked state in which the pivot member 22 is axially movable.

As the pivot member 22 is shifted to the unlocked state, the pivot member 22 is pushed downwardly against a biasing force of the lost motion spring 254. Therefore, it is possible to realize a valve deactivation state as illustrated in FIG. 3C. Specifically, the biasing force of the return spring 16 (17) biasing the intake valve 8 (exhaust valve 9) upwardly is set to be greater than that of the lost motion spring 254 biasing the pivot member 22 upwardly. Thus, in the unlocked state, when the cam portion 18a (19a) pushes the cam follower 20a (21a) downwardly accompanied by rotation of the camshaft 18 (19), a top of the intake valve 8 (exhaust valve 9) serves as the swing pivot of the swing arm 20 (21). Therefore, the pivot member 22 is displaced downwardly against the biasing force of the lost motion spring 254. In this process, the intake valve 8 (exhaust valve 9) is kept in the closed state. During the reduced-cylinder operation in which the first and fourth cylinders 2A and 2D are deactivated, the valve deactivation mechanism 25a (specifically, pivot member 22) is set in the unlocked state. Thus, the opening-closing movements of the intake valve 8 (exhaust valve 9) in each of the first and fourth cylinders 2A and 2D are stopped, and the intake valve 8 (exhaust valve 9) is kept in the closed state.

The valve deactivation mechanism 25a is of a hydraulically-driven type. The valve deactivation mechanism 25a, more specifically, each of the lock pins 252 of the valve deactivation mechanism 25a is driven by oil pressure. Each of the lock pins 252 is configured to be moved in and out of a corresponding one of the through-holes 251a in response to oil pressure supplied thereto to thereby establish or release the fitting between corresponding ones of the lock pins 252 and the through-holes 251a of the outer casing 251.

Figure 4:
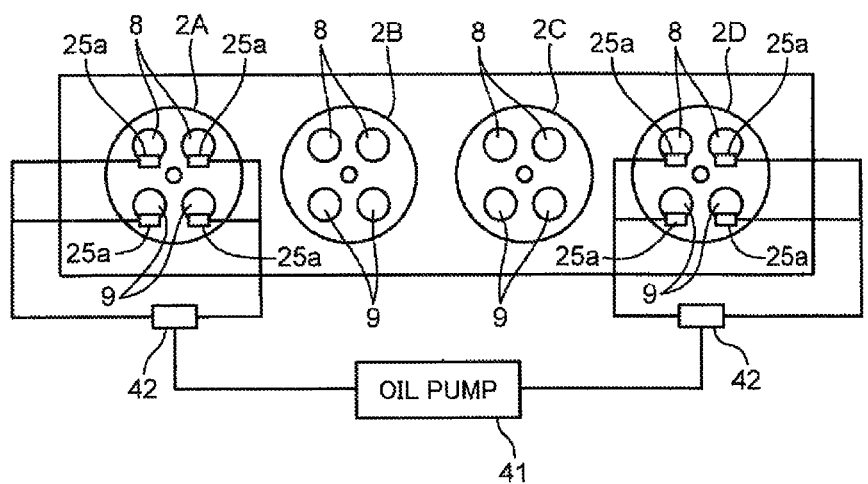
FIG. 4 is a diagram illustrating a pathway of hydraulic oil for the valve deactivation mechanism.

As illustrated in FIG. 4, hydraulic oil is supplied from an oil pump 41 to the valve deactivation mechanism 25a. A solenoid valve (hereinafter, referred to as a valve-deactivation solenoid valve) 42 is provided in an oil passage between the oil pump 41 and the valve deactivation mechanism 25a. The valve-deactivation solenoid valve 42 is operable to change the level of oil pressure to be supplied from the oil pump 41 to the valve deactivation mechanism 25a. Specifically, in a state in which the valve-deactivation solenoid valve 42 is not energized, i.e., in an OFF state of the valve-deactivation solenoid valve 42, the oil passage between the oil pump 41 and the valve deactivation mechanism 25a is closed by the valve-deactivation solenoid valve 42, and the lock pins 252 are fitted into the respective through-holes 251a of the outer easing 251. Then, the pivot member 22 is locked, and the intake valve 8 (exhaust valve 9) becomes operable and closable. On the other hand, in a state in which the valve-deactivation solenoid, valve 42 is energized, i.e., in an ON state of the valve-deactivation solenoid valve 42, the oil passage between the oil pump 41 and the valve deactivation mechanism 25a is opened. Accordingly, the fitting between corresponding ones of the lock pins 252 and the through-holes 251a of the outer casing 251 is released. Then, the pivot member 22 is set to an unlocked state, and the intake valve 8 (exhaust valve 9) is kept in the closed state.

As illustrated in FIG. 4, in this embodiment, the valve-deactivation solenoid valve 42 is provided in a number of one per cylinder, i.e. in a number of two in total. Specifically, one of the two valve-deactivation solenoid valves 42 is operable to simultaneously change respective levels of oil pressure to be supplied to the valve deactivation mechanism 25a associated with the intake valve 8 of the first cylinder 2A and the valve deactivation mechanism 25a associated, with the exhaust valve 9 of the first cylinder 2A. The other valve-deactivation solenoid valve 42 is operable to simultaneously change respective levels of oil pressure to be supplied to the valve deactivation mechanism 25a associated with the intake valve 8 of the fourth cylinder 21) and the valve deactivation mechanism 25a associated with the exhaust valve 9 of the fourth cylinder 2D.

(3) Control System

Figure 5:
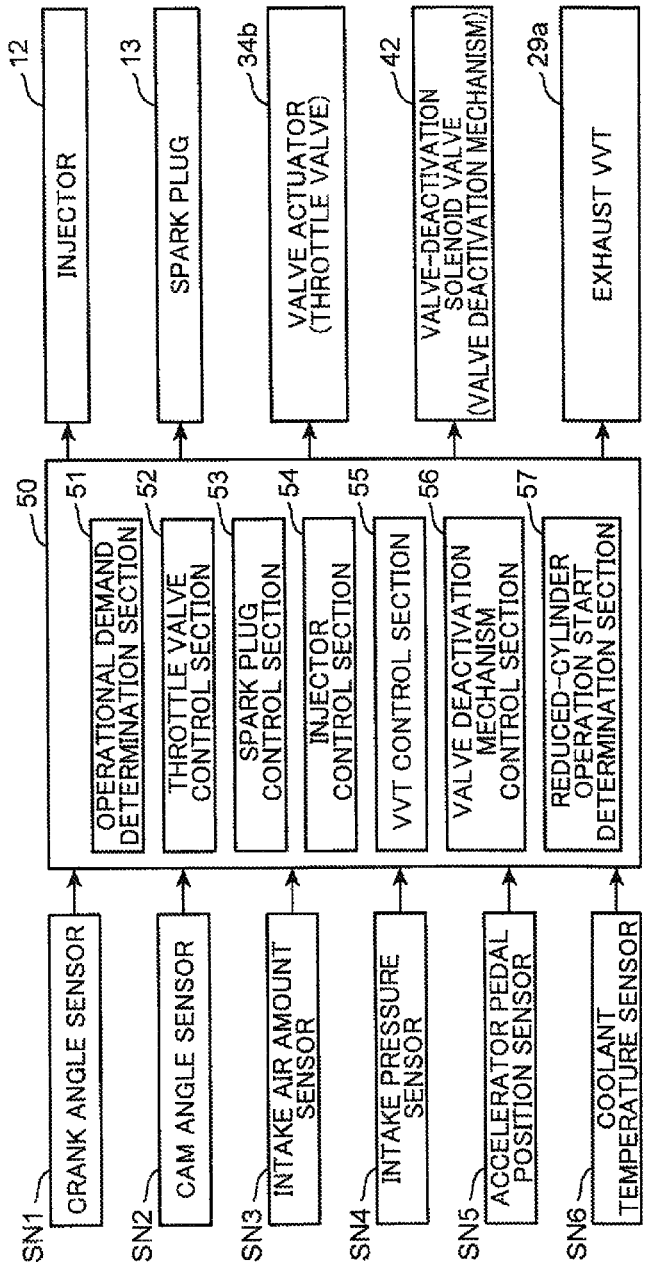
FIG. 5 is a block diagram illustrating an engine control system.

A control system of the engine will be described below. The engine in this embodiment is configured such that components of the engine are comprehensively controlled by an ECU (Engine Control Unit, control device) 50 illustrated in FIG. 5. As is well known, the ECU 50 is a microprocessor composed of a CPU, a ROM, and a RAM.

A plurality of sensors are provided in the engine and in other vehicle components to detect respective state quantities of the components. Information from the sensors is input to the ECU 50.

For example, the cylinder block 3 is provided with a crank angle sensor SN1 for detecting a rotational angle (crank angle) and a rotational speed of the crankshaft 15. The crank angle sensor SN1 is operable to output a pulse signal according to rotation of a non-illustrated crank plate rotatable together with the crankshaft 15, wherein, based on the pulse signal, it is possible to identify the rotational angle of the crank shaft 15, and the rotational speed of the crank shaft 15 i.e. an engine speed.

The cylinder head 4 is provided with a cam angle sensor SN2. The cam angle sensor SN2 is operable to output a pulse signal according to passing of teeth of a signal plate rotatable together with the camshaft (18 or 19), wherein, based on this pulse signal and the pulse signal from the crank angle sensor SN1, it is possible to identify cylinder discrimination information indicative of in which stroke of the combustion cycle each of the cylinders is.

The surge tank 32 of the intake passage 30 is provided with, an intake air amount sensor SN3 for detecting an amount of air (intake air amount) to be introduced into each of the cylinders 2A to 2D after passing through the surge tank. 32, and an intake pressure sensor SN4 for detecting an internal pressure of the surge tank 32.

In the vehicle, a non-illustrated accelerator pedal to be operated by a driver is provided with an accelerator pedal position sensor SN5 for detecting a degree of depression of the accelerator pedal (accelerator pedal position). Further, a coolant temperature sensor SN6 for detecting a temperature of coolant for cooling the engine body 1 (hereinafter, also referred to as an engine coolant temperature) is provided.

The ECU 50 is electrically connected to the sensors SN1 to SN6, and is operable, based on signals input from these sensors, to acquire the variety of information (crank angle, engine speed, intake air amount, intake pressure, accelerator pedal position, and engine coolant temperature).

The ECU 50 is operable to control the respective components of the engine while performing various determinations, calculations and others, based on input signals from the sensors SN1 to SN6. The ECU 50 is also electrically connected to the injectors 12, the spark plugs 13, the valve actuator 34b (throttle valve 34a), the valve-deactivation solenoid valves 42, and the exhaust VVts 29a, and is operable to output a control signal to each of these devices, based on results of the calculation and others. In this embodiment, a set of the injector 12 and the spark plug 13 is provided in a number of one per cylinder, i.e., in a number of four in total. However, in FIG. 5, each of a group of the four injectors and a group of the four spark plugs is denoted by one block. Further, in this embodiment, the valve-deactivation solenoid valve 42 is provided in a number of one for the valve deactivation mechanisms 25a of the first cylinder 2A and in a number of one for the valve deactivation mechanisms 25a of the fourth cylinder 2D, i.e., in a number of two in total. However, in FIG. 5, the two valve-deactivation solenoid valves 42 are denoted by one block.

More specific functions of the ECU 50 will be described below. The ECU 50 includes, as functional elements, an operational demand determination section 51, a throttle valve control section 52, a spark plug, control section 53, an injector control section 54, a VVT control section 55, a valve deactivation mechanism control section 56, and a reduced-cylinder operation start determination section 57.

Figure 6:
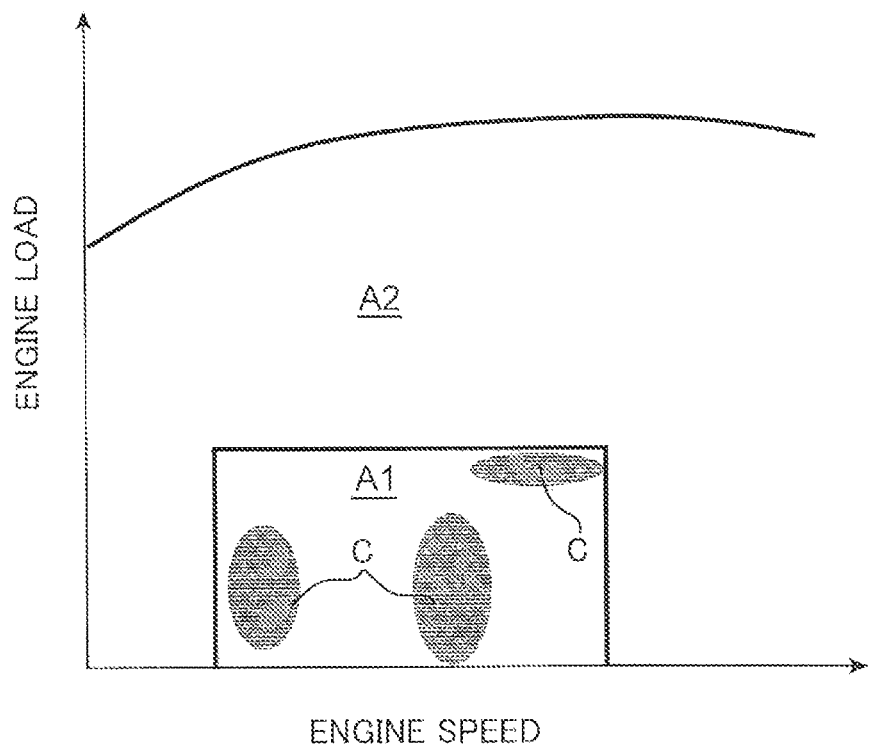
FIG. 6 is a diagram illustrating each operating range.

The operational demand determination section 51 is operable, based on engine operating conditions (engine load, engine speed, engine coolant temperature, etc.) identified from detection values, etc., of the accelerator pedal position sensor SN5, the crank angle sensor SN1, and the coolant temperature sensor SN6 to determine which of the reduced-cylinder operation and the all-cylinder should be performed as an operation mode of the engine. For example, as illustrated in FIG. 6, when the engine is operated in a specific operating range A1 where the engine load and the engine speed are relatively low, the operational demand determination, section 51 determines that there is a demand for the reduced-cylinder operation in which the first and fourth cylinders 2A and 2D are deactivated (only the second and third, cylinders 2B and 2C are activated). On the other hand, when the engine load and the engine speed fall within the remaining operating range A2 other than the specific operating range A1, the operational demand determination section 51 determines that there is a demand for the all-cylinder operation in which all of the first to fourth cylinders 2A to 2D are activated. The operational demand determination section 51 is also operable, daring a cold start of the engine and during rapid acceleration/deceleration, to determine that the all-cylinder operation should be performed. For example, when the engine coolant temperature detected by the coolant temperature sensor SN6 is equal to of less than a predetermined value, and when a change rate of the accelerator pedal position detected by the accelerator pedal position sensor SN5 is greater than a predetermined value, the operational demand determination section 51 determines that the all-cylinder operation should be performed.

In this regard, the engine control apparatus according to this embodiment is configured to, even when the operational demand determination section 51 determines that there is a switching demand for switching from the all-cylinder operation, to the reduced-cylinder operation, execute a preparatory control for preparation toward the reduced-cylinder operation, instead of immediately starting the reduced-cylinder operation, and, after completion of the preparatory control, start the reduced-cylinder operation. The reduced-operation start determination section 57 is designed to determine whether the preparatory control should be terminated to start the reduced-cylinder operation, and configured to perform the determination based on the intake air amount or the like. A specific control content of the preparatory control and a specific determination process of the reduced-cylinder operation start determination section 57 will be described later.

The throttle valve control section 52 is operable to control an opening angle of the throttle valve 34a, specifically, the intake air amount or the amount of air to be taken into each of the cylinders. The spark plug control section 53 is operable to control the spark plugs 13. The injector control section 54 is operable to control the injectors 12. The valve-deactivation mechanism control section 56 is operable to control the valve-deactivation solenoid valves 42 for changing the levels of oil pressure to be supplied to the valve deactivation mechanisms 25a of the S-HLAs 25, i.e., a state of the opening-closing movements of the intake valves 8 and the exhaust valves 9 of the first and fourth cylinders 2A and 2D. The VVT control section 55 is operable to control the intake VVTs 28a and the exhaust VVTs 29a for changing the valve opening timings and the valve closing timings of the intake valves 8 and the exhaust valves 9. Details of control contents of the control sections 52 to 56 will be described below.

(4) Control Contents (4-1) Basic Control

Control contents of the control sections except for a time period during which the preparatory control is executed, in other words, during the all-cylinder operation in a normal state and during the reduced-cylinder operation will be described below.

The throttle valve control section 52 controls the valve actuator 34b to change the opening angle of the throttle valve 34a so as to attain a preset target torque corresponding to a detection value of the accelerator pedal position sensor SN5, i.e., an amount of depression of the accelerator pedal.

Specifically, based on the target torque, the throttle valve control section 52 calculates a required cylinder charging efficiency which is a charging efficiency required for attaining the target torque. The throttle valve control section 52 calculates a required in-intake passage air amount which is an amount of air in the intake passage 30, required for attaining the required cylinder charging efficiency. More specifically, the required in-intake passage air amount is calculated, based on a required cylinder charging efficiency, and based on a reference surge tank volumetric efficiency, which is set in advance according to engine operating conditions (e.g. the engine speed, the phase of the intake VVT 28*a*, in other words, the opening/closing timing of the intake valve 8).

Then, based on the required in-intake passage air amount, the current amount of air in the intake passage 30, and a flow rate of air to be taken into each cylinder through the intake passage 30, the throttle valve control section 52 calculates a required throttle-valve passing flow rate which is a target value of a flow rate of air passing through the throttle valve 34*a*. Then, based on the required throttle-valve passing flow rate, the throttle valve control section 52 calculates a throttle valve opening angle required for attaining the flow rate (target throttle valve opening angle). Then, the throttle valve control section 52 controls the throttle valve 34*a* in such a manner as to allow an actual opening angle thereof to become coincident with the target throttle valve opening angle.

For example, the target throttle valve opening angle can be calculated using the Bernoulli's theory. Specifically, the flow rate of air passing through the throttle valve 34*a* is determined by the opening angle of the throttle valve 34*a*, and a ratio between pressures on respective upstream and downstream sides of the throttle valve 34*a* (a ratio of the downstream-side pressure to the upstream-side pressure; hereinafter referred to as throttle-valve upstream and downstream pressure ratio). Thus, after detecting pressures on the upstream and downstream sides of the throttle valve 34*a* by a sensor, the target throttle valve opening angle can be calculated, based on the obtained detection values, and the required throttle-valve passing flow rate. More specifically, the opening angle of the throttle valve 34*a*, the throttle-valve upstream and downstream pressure ratio, and the amount of air passing through the throttle valve 34*a* are preliminarily measured, and a relationship between these parameters is stored in the form of a map. Then, a value of the opening angle of the throttle valve 34*a* corresponding to the detected value of the throttle-valve upstream and downstream pressure ratio and the required throttle-valve passing flow rate is extracted from the map, and set as the target throttle valve opening angle, for example, in the case where the amount of air passing through the throttle valve 34*a* is constant, this map is configured such that, as the throttle-valve upstream and downstream pressure ratio becomes closer to 1, the opening angle of the throttle value 34*a* becomes larger.

Meanwhile, during the reduced-cylinder operation, the number of activated cylinders capable, of generating, power output is reduced. In view of the above, in order to generate the same engine power output as that during the all-cylinder operation, it is necessary to increase power output in each of the activated cylinders (second and third cylinders 2B and 2C) to become greater than power output in each cylinder during the all-cylinder operation. For this reason, during the reduced-cylinder operation, it is necessary to increase power output (generated torque) per cylinder, and therefore, to increase the amount of air (intake air amount) to be taken into each of the cylinders. Thus, a target value of an intake air amount per cylinder during the reduced-cylinder operation is set to be greater than a target, value of an intake air amount per cylinder during the all-cylinder operation. Then, in order to increase the amount of air to be taken into each of the cylinders, it is necessary to set an internal pressure of the intake passage 30 (pressure on the downstream side of the throttle valve 34*a*) in such a manner as to be higher than that during the all-cylinder operation. As a result, during the reduced-cylinder operation, the throttle-valve upstream and downstream, pressure ratio has a value closer to 1 than that during the all-cylinder operation. Thus, the opening angle of the throttle valve 34*a* during the reduced-cylinder operation is controlled to be shifted to an opening angle (toward the fully-open side) larger than the opening angle during the all-cylinder operation.

The spark plug control section 53 switches between two modes of control of the spark plugs 13 of deactivatable cylinders (first and fourth cylinders 2A and 2D) depending on whether the engine is in the reduced-cylinder operation or in the all-cylinder operation. Specifically, when the engine is operated in the all-cylinder operation, the spark plug control section 53 performs ignition by driving the spark plugs 13 in all of the cylinders 2A to 2D. On the other hand, when the engine is in the reduced-cylinder operation, the spark plug control section 53 inhibits driving of the spark plugs 13 of the deactivatable cylinders (first and fourth cylinders 2A and 2D) so as to stop combustion in the deactivated cylinders.

When activating the spark plugs 13, the spark plug control section 53 determines ignition timings for the spark plugs 13 according to the operating conditions, and issues instructions to the respective spark plugs 13. Specifically, the spark plug control section 53 stores therein an ignition timing map, which is predetermined in relation to engine speed and engine load. The spark plug control section 53 extracts an ignition timing corresponding to an actual engine speed and an actual engine load from the map, and subjects the extracted ignition timing to correction based on a detection value of the intake pressure sensor SN4 and others for determining a basic ignition timing. As the ignition timing map, two types consisting of a type for the reduced-cylinder operation and a type for the all-cylinder operation are prepared, and one of the two types corresponding to a desired operation is used.

When the determined basic ignition timing is an excessively retarded timing, misfire may occur. In view of the above, in the embodiment, the spark plug control section 53 determines a final ignition timing so that the ignition timing is not retarded than a predetermined first retard limit. Specifically, the spark plug control section 53 determines the timing on the advance side out of the determined basic, ignition timing and the first retard limit, as the final ignition timing. The first retard limit is stored in a map, which is predetermined in relation to each of the operating conditions (such as an engine speed and an engine load). The spark plug control section 53 extracts the first retard limit corresponding to a desired operating condition from the map, and compares the first retard limit with the basic ignition timing.

The injector control section 54 switches between two modes of control for the injectors 12 of the deactivatable cylinders (first and fourth cylinders 2A and 2D) depending on whether the engine is operated in the reduced-cylinder operation, or in the all-cylinder operation. Specifically, when the engine is operated in the all-cylinder operation, the injector control section 54 performs fuel injection by driving the injectors 12 in all of the cylinders 2A to 2D. On the other hand, when the engine is operated in the reduced-cylinder operation, the injector control section 54 inhibits fuel, injection to the deactivatable cylinders (first and fourth cylinders 2A and 2D).

When causing the injectors 12 to perform fuel injection, the injector control section 54 determines injection amounts according to operating conditions (such as an engine speed, an engine load, and a state that the engine is in the reduced-cylinder operation or in the all-cylinder operation), and issues the determination results to the respective injectors 12.

The valve deactivation mechanism control section 56 controllably switches the control of the valve-deactivation solenoid valves 42 depending on whether the engine is operated in the reduced-cylinder operation or in the all-cylinder operation. Specifically, when tire engine is operated in the all-cylinder operation, the valve deactivation mechanism control section 56 controls the solenoid valves 42 to be shifted to the OFF state to thereby allow the opening-closing movements of the intake valves 8 and the exhaust valves 9 in all of the cylinders 2A to 2D. On the other hand, when the engine is operated in the reduced-cylinder operation, the valve deactivation mechanism control section 56 controls the valve-deactivation solenoid valves 42 to be shifted to the ON state to thereby keep the intake valves 8 and the exhaust valves 9 of the deactivatable cylinders (first and fourth cylinders 2A and 2D) in the closed state.

The VVT control section 55 determines the opening and closing timings of the intake valves 8 and the exhaust valves 9 according to operating conditions (such as an engine speed, an engine load, and a state that, the engine is in the reduced-cylinder operation or in the all-cylinder operation), and issues the determination results to the intake VVTs 28a and the exhaust VVTs 29a.

Figure 7:
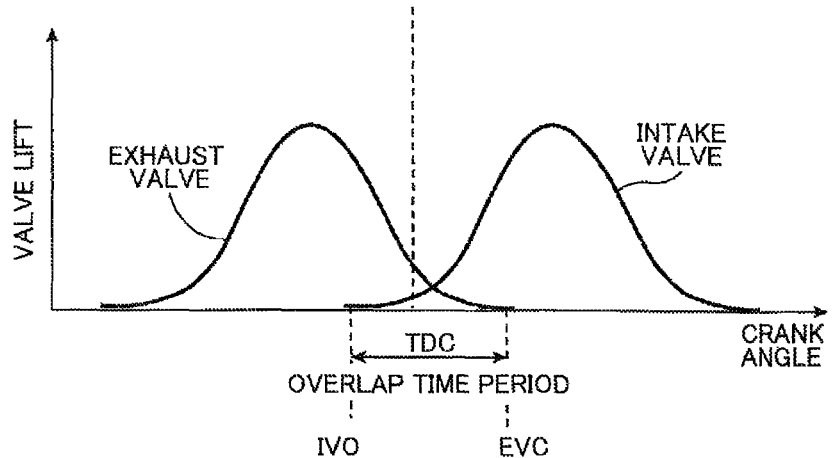
FIG. 7 is a diagram illustrating a valve lift of an intake value and a valve lift of an exhaust valve.

In the embodiment, the opening and closing timings of the intake valves 8 and the exhaust valves 9 are set in such a manner that a time period when the intake valve 8 is opened and a time period when the exhaust valve 9 is opened overlap each other with respect to the compression top dead center position in substantially all the operating ranges (ranges other than a low load range when e.g., the engine is in an idling state). Specifically, as illustrated in FIG. 7, the valve opening timing (IVO) of the intake valve 8 is set on the advance side than the compression top dead center position (TDC), and the valve closing timing (EVC) of the exhaust valve 9 is set on the retard side than the compression top dead center position so that there exists an overlap time period when both of the intake valve 8 and the exhaust valve 9 are opened with respect to the compression top dead, center position. This is for the purpose of improving the fuel efficiency by reducing pumping loss, and for the purpose of enhancing the emission performance by letting a larger amount of gas after combustion remain in the cylinders to thereby increase the amount of internal EGR gas as the remaining gas after combustion. In other words, as far as both of the intake valve 8 and the exhaust valve 9 are opened before and after the compression top dead center position, it is possible to allow the gas after combustion to be temporarily discharged to the intake ports 6 and to the exhaust ports 7, and then to introduce the gas after combustion into the cylinders through the intake ports 6 and through the exhaust ports 7. This makes it possible to let a larger amount of gas after combustion remain in the cylinders. It should be noted, however, combustion stability may be lowered if a large amount of gas after combustion remains (the amount of internal EGR gas is increased) in the low load range when e.g. the engine is in an idling state. In view of the above, in the embodiment, the opening and closing timings of the intake valves 8 and the exhaust valves 9 are set in such a manner that a time period when the intake valve 8 is opened and a time period when the exhaust valve 9 is opened do not overlap each other with respect to the compression top dead center position in the low load range.

(4-2) Preparatory Control (i) Control Content

As mentioned above, during the reduced-cylinder operation, the intake air amount per cylinder is increased to allow power output in each of the activated cylinders to be increased to be greater than that during the all-cylinder operation. However, due to a delay in change of the actual intake air amount, if immediately after issuance of a switching demand for switching from the all-cylinder operation to the reduced-cylinder operation, combustion in the deactivatable cylinders (first and fourth cylinders 2A and 2D) is stopped to start the reduced-cylinder operation, the actual intake air amount in each of the activated cylinders (second and third cylinders 2B and 2C) becomes deficient, which may lead, to lowering of engine torque and cause torque shock. The preparatory control is provided to avoid occurrence of torque shock. The preparatory control is started in response to a determination that there is a switching demand for switching from the all-cylinder operation to the reduced-cylinder operation by the operational demand determination section 51.

As the preparatory control, the throttle valve control section 52 executes a control of changing the opening angle of the throttle valve 34a in such a manner that the per-cylinder intake air amount coincides with the intake air amount in the reduced-cylinder operation. As mentioned above, the per-cylinder intake air amount during, the reduced-cylinder operation is set to be greater than the per-cylinder intake air amount during the all-cylinder operation in a normal state immediately before issuance of a switching demand for switching from the all-cylinder operation to the reduced-cylinder operation. Therefore, as the preparatory control, the throttle valve control section 52 controls to change the opening angle of the throttle valve 34a toward an opening angle closer to the fully-open side than the opening angle during the all-cylinder operation, in a normal state immediately before issuance of a switching demand for switching from the all-cylinder operation to the reduced-cylinder operation.

In this embodiment, the throttle valve control section 52 executes, as the preparatory control, the same control as the control during the reduced-cylinder operation as described in the subsection (4-1). Upon start of the preparatory operation, the throttle valve control section 52 changes a current opening angle of the throttle, valve 34a to an opening angle during the reduced-cylinder operation, i.e., to an opening angle closer to the fully-open side than that during the all-cylinder operation. As mentioned above, in this embodiment, immediately after a determination that there is a switching demand for switching from the all-cylinder operation to the reduced-cylinder operation, the throttle valve control section 52 starts the throttle valve control during the reduced-cylinder operation.

As the preparatory control, the valve deactivation mechanism control section 56 executes the control of switching the valve-deactivation solenoid valves 42 to the OFF state to allow the opening-closing movements of the intake valves 8 and the exhaust valves 9 in all of the cylinders 2A to 2D. Specifically, even when the operational demand determination section 51 issues the switching demand for switching from, the all-cylinder operation to the reduced-cylinder operation, the valve deactivation mechanism control section 56 continues to allow the opening-closing movements of the intake valves 8 and the exhaust valves 9 in all of the cylinders 2A to 2D without switching the valve-deactivation solenoid valves 42 to the ON state.

As the preparatory control, the injector control section 54 and the spark plug control section 53 control, respectively, the injectors 12 and the spark plugs 13 to perform combustion in all of the cylinders 2A to 2D. Specifically, even when the operational demand determination section 51 issues the switching demand for switching from the all-cylinder operation to the reduced-cylinder operation, the injector control section 54 and the spark plug control section 53 perform, respectively, fuel injection and ignition in all of the cylinders 2A to 2D without stopping fuel injection and ignition in the deactivatable cylinders (first and fourth cylinders 2A and 2D).

As mentioned above, in this apparatus, even when the operational demand determination section 51 issues the switching demand for switching from the all-cylinder operation to the reduced-cylinder operation, during execution of the preparatory control, the opening-closing movements of the intake valves 8 and the exhaust valves 9 are allowed in all of the cylinders 2A to 2D, and combustion is performed in all of the cylinders 2A to 2D.

As mentioned above, in the preparatory control, the throttle valve control section 52 controls the per-cylinder intake air amount to coincide with the intake air amount during the reduced-cylinder operation and to be greater than the intake air amount during the all-cylinder operation in a normal state. Therefore, if combustion is performed in all of the cylinders 2A to 2D under the condition that the intake air amount is relatively large as mentioned above, the engine torque becomes greater than a torque during the all-cylinder operation in a normal state, i.e., a torque immediately before start of the preparatory control, and a torque requested from a driver or the like.

For this reason, in this apparatus, during the preparatory control, the ignition timing is retarded to a timing at which it is possible to avoid an increase in engine torque caused by an increase in intake air amount. Specifically, during the preparatory control, the spark plug control section 53 controls the ignition timing to be shifted toward a retard side than an ignition timing during the all-cylinder operation in a normal state, i.e., than an ignition, timing immediately before start of the preparatory control.

Specifically, the spark plug control section 53 calculates how much the actual intake air amount is increased with respect to the intake air amount during the all-cylinder operation in a normal state, and calculates a retard amount corresponding to the calculated increment in intake air amount, specifically, an increment in engine torque corresponding to the calculated increment in intake air amount. In this embodiment, the spark ping control section 53 stores therein a map indicative of a relationship between an increment in intake air amount and a retard amount, which is predetermined in relation to each of the operating conditions (such as an engine speed and an engine load), and extracts a retard amount corresponding to a calculated increment in intake air amount and the operating condition from the map. Then, the spark plug control section 53 determines, as an ignition-timing for the preparatory control, a timing set by retarding, by the calculated retard amount, a basic ignition timing during the all-cylinder operation in a normal state, which is determined along the process described in the subsection (4-1).

As mentioned above, when the ignition timing is excessively retarded, misfire may occur. In view of the above, in this apparatus, for enhancing combustion stability, during the preparatory control, a control of shifting the valve closing timing of the exhaust valve 9 toward the advance side than the valve closing timing during the all-cylinder operation in a normal state is executed in a specific operating range in which the ignition timing may exceed a limit timing (hereinafter, also referred to as a misfire limit timing) at which misfire is highly likely to occur when the ignition timing is retarded to avoid an increase in engine torque (e.g. the ranges indicated by C in FIG. 6, hereinafter, also simply referred to as the specific ranges C), specifically, in a specific operating range in which it is impossible to avoid an increase in engine torque even when the ignition timing is set to the misfire limit timing. Thus, the ignition timing is retarded, while avoiding occurrence of misfire.

In other words, as mentioned above, in the embodiment, the valve closing timing of the exhaust valve 8 is set to a timing on the retard side than the compression top dead center position in such a manner that a time period when the intake valve 8 is opened and a time period when the exhaust valve 9 is opened overlap each other with respect to the compression top dead center position in at least the operating range A1 when the reduced-cylinder operation is performed (at a time of switching from the all-cylinder operation to the reduced-cylinder operation). Therefore, setting the valve closing timing of the exhaust valve 8 on the advance side in the specific operating ranges C included in the reduced-cylinder operating range A1 makes it possible to reduce the amount of gas after combustion which may flow back from the exhaust ports 7 to the cylinders 2A to 2D, i.e., the amount of internal EGR gas. This is advantageous in enhancing, combustion stability while avoiding occurrence of misfire.

Specifically, during execution of the preparatory control, the VVT control section 55 determines whether the operating range is a specific range C. When it is determined that the operating range is the specific range C, the VVT control section 55 shifts the valve closing timing of the exhaust valve 9 toward the advance side than the valve closing timing of the exhaust valve 9 during the all-cylinder operation in a normal state. In the embodiment, the valve closing timing of the exhaust valve 9 is changed in the range on the retard side than the compression top dead center position so that it is possible to securely reduce the amount of internal EGR gas by advancing the valve closing timing of the exhaust valve 9. Further, the advance amount of the valve closing timing of the exhaust valve 9 (the advance amount from the valve closing timing of the exhaust valve 9 during the all-cylinder operation in a normal state) is increased, as the retard amount of the ignition timing to be set by execution of the preparatory control (the retard amount from the basic ignition timing during the all-cylinder operation in a normal state) is increased. For example, the advance amount is increased in proportion to the retard amount of the ignition timing.

Figure 8:
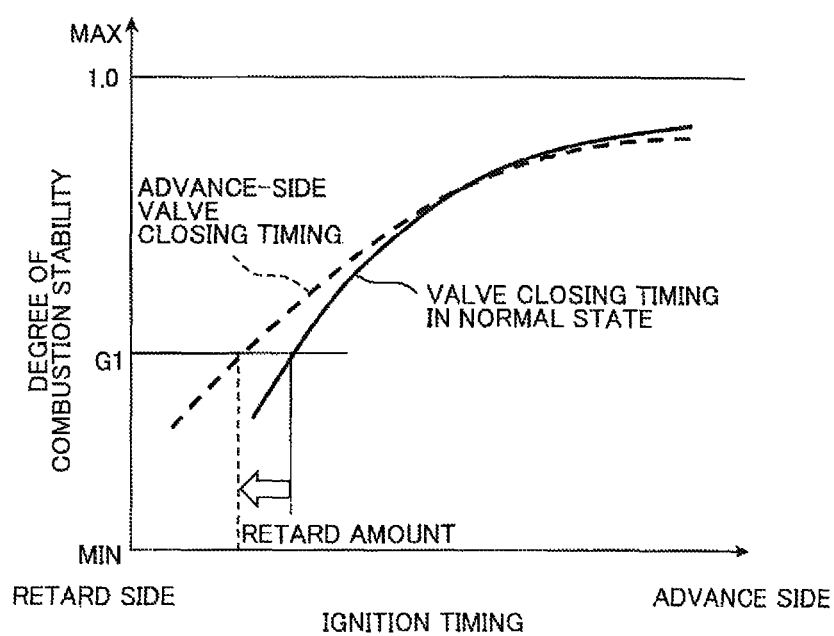
FIG. 8 is a diagram illustrating a relationship between a valve closing timing of an exhaust valve, an ignition timing, and a degree of combustion stability.

FIG. 8 illustrates a relationship between a valve closing timing of the exhaust valve 9, combustion stability, and an ignition timing. The graph of FIG. 8 is a graph, wherein the horizontal axis denotes an ignition timing, and the vertical axis denotes a degree of combustion stability. The solid line indicates a relationship between these parameters when the valve closing timing of the exhaust valve 9 is set to a valve closing timing of the exhaust valve 9 during the all-cylinder operation in a normal state. The broken line indicates a relationship between these parameters when the valve closing timing of the exhaust valve 9 is advanced than the valve closing timing of the exhaust valve 9 during the all-cylinder operation in a normal state. The degree of combustion stability on the vertical axis is a value obtained by dividing a minimum value of engine torque when combustion is performed a plural number of times in a certain operating condition with an average value. The lower the value is, the poorer combustion stability is.

As illustrated in FIG. 8, regarding both of the solid line and the broken line, as the ignition timing is shifted toward the retard side, the degree of combustion stability is lowered, and combustion stability is deteriorated. The degree of combustion stability indicated by the broken line such, that the valve closing timing of the exhaust valve 9 is set on the advance side is higher than that indicated by the solid line, and the ignition timing capable of securing a predetermined degree of combustion stability (e.g. the degree of combustion stability indicated by G1) is set on the retard side. As mentioned above, setting the valve closing timing of the exhaust valve 9 on the advance side makes it possible to enhance combustion stability, and makes it possible to shift the ignition timing toward the retard side while avoiding occurrence of misfire.

The misfire limit timing is set to an ignition timing at which tire degree of combustion stability is set to a predetermined value (e.g. 0.5). The specific range C is set to a range such that the value obtained by dividing an average value of engine torque when the ignition timing is set to the misfire limit timing with an average value of engine torque at a basic ignition timing in a normal state, specifically, a value (hereinafter, referred to as a torque-down rate) indicative of how much the engine torque can be lowered from a normal state by setting the ignition timing to the misfire limit timing is smaller than a predetermined value (in the embodiment, smaller than 0.5), and that it is difficult to retard the ignition timing to a timing at which it is possible to avoid an increase in engine torque caused by an increase in intake air amount, while keeping the value of engine torque reduction from falling below a value obtained by multiplying a value of torque in a normal state with the aforementioned predetermined value (0.5) even when the ignition timing is set to the misfire limit timing.

As mentioned above, in the embodiment, the valve closing timing of the exhaust valve 9 is advanced so as to avoid occurrence of misfire caused by shifting the ignition timing toward the retard side. However, misfire may occur regardless of a control of advancing the valve closing timing of the exhaust valve 9 when a retard amount of the ignition timing reaches a certain value.

In view of the above, in the embodiment, retarding of the ignition timing than a predetermined limit timing is inhibited even during execution of the preparatory control. It should be noted, however, retarding the valve closing timing of the exhaust valve 9 makes it possible to enhance combustion stability, and the preparatory control execution time period is relatively short. Therefore, when the preparatory control is executed, the ignition timing is allowed to be retarded than the first retard limit during the control in a normal state described in the subsection (4-1). Specifically, during the preparatory control, the spark plug control section 53 determines, as the final ignition timing, a timing on the advance side out of a second retard limit, which is a predetermined retard limit for the preparatory control, and the determined ignition timing for the preparatory control. The second retard limit is set on the retard side than the first retard limit to be used in a normal state. As well, as the first retard limit, the second retard limit is predetermined in relation to each of the operating conditions (such as an engine speed and an engine load), and is stored in a map.

(ii) Termination of Preparatory Control and Determination on Start of Reduced-Cylinder Operation The preparatory control is executed until the reduced-cylinder operation start determination section 57 determines that the preparatory control is terminated and the reduced-cylinder operation is started.

As mentioned above, the preparatory control is a control for avoiding occurrence of torque shock due to a shortage of the intake air amount of the activated cylinders and lowering of engine torque at the time of switching from the all-cylinder operation to the reduced-cylinder operation. In this regard, basically, the reduced-cylinder operation start determination section 57 determines that the preparatory control is terminated and the reduced-cylinder operation is started at a time when the per-cylinder air intake amount is increased to the intake air amount during the reduced-cylinder operation.

However, when a state such that the ignition timing is excessively retarded is continued for a long period of time, misfire is highly likely to occur. In view of the above, in the embodiment, in order to securely avoid occurrence of misfire, the reduced-cylinder operation start determination section 57 determines that the preparatory control is terminated and the reduced-cylinder operation is stalled when a time period during which the ignition timing is set to the second retard limit exceeds a predetermined reference time period, even when the intake air amount does not reach the intake air amount during the reduced-cylinder operation.

(iii) Flow of Control at Time of Switching from all-Cylinder Operation to Reduced-Cylinder Operation A flow of the preparatory control to be executed by the ECU 50 will be described with reference to the flowchart of FIG. 9.

First of all, in Step S1, reading of the engine load, the engine speed, the coolant temperature (engine coolant temperature), the accelerator position and others, identified by detection values of the above sensors, is performed. Subsequently, in Step S2, it is determined whether or not there is the switching demand for switching from the all-cylinder operation to the reduced-cylinder operation. As mentioned above, this determination is performed by the operational demand determination section 51. The operational demand determination section 51 determines whether or not there is the switching demand for switching from the all-cylinder operation to the reduced-cylinder operation, based on whether or not the engine load and the engine speed lie in a predetermined operating range, based on whether or not the engine coolant temperature is equal to or greater than a predetermined temperature, and based on whether or not a change rate of the accelerator pedal position is equal to or greater than a predetermined value.

When the determination result in Step S2 is NO, i.e., when it is determined that there is no switching demand for switching from the all-cylinder operation to the reduced-cylinder operation (shifting from the all-cylinder operation to the reduced-cylinder operation should not be performed), the routine proceeds to Step S3, and the all-cylinder operation is maintained. On the other hand, when the determination result in Step S2 is YES, i.e., when it is determined that there is the switching demand for switching from the all-cylinder operation to the reduced-cylinder operation, the routine proceeds to Step S4.

In Step S4, the oil pump 41 is actuated, and the level of oil pressure of the oil passage between the oil pump 41 and the valve deactivation mechanism 25a, specifically, the level of oil pressure of the oil passage between the oil pump 41 and the valve-deactivation solenoid valves 42 is increased. This is for the purpose of securely keeping the intake valves 8 and the exhaust valves 9 of the deactivated cylinders (first, and fourth cylinders 2A and 2D) in the closed state when the reduced-cylinder operation is stalled. Before start of the reduced-cylinder operation, the level of oil pressure of the oil passage between the oil pump 41 and the valve-deactivation solenoid valves 42 is increased. However, since the valve-deactivation solenoid valves 42 are in the OFF state, at this point of time, the intake valves 8 and the exhaust valves 9 of the deactivated cylinders (first and fourth cylinders 2A and 2D) are openably and closably driven.

In Step S4, the opening angle of the throttle valve 34a is shifted toward the fully-open side than that during the all-cylinder operation in a normal state so that the intake air amount coincides with the intake air amount during the reduced-cylinder operation.

In Step S6 following Step S5, the ignition timing is shifted toward the retard side than that during the all-cylinder operation in a normal state. In the embodiment, as mentioned above, the spark plug control section 53 determines, as the final ignition timing, a timing on the advance side, out of the ignition timing set by retarding, by an amount corresponding to an increment from the intake air amount during the all-cylinder operation, the ignition timing during the all-cylinder operation in a normal state, and the second retard limit.

In Step S7 following Step S6, it is determined whether or not the operating range is the specific range C. When the determination result in Step S7 is YES, and the operating range is the specific range C, the routine proceeds to Step S8. In Step S8, the valve closing timing of the exhaust valve 9 is set on the advance side than that during the all-cylinder operation in a normal state. As mentioned above, in the embodiment, the VVT control section 55 controls the valve closing timing of the exhaust valve 9 according to the retard amount of the ignition timing set in Step S6 (the retard amount from the ignition timing during the all-cylinder operation in a normal state) to be set on the advance side than the valve closing timing of the exhaust valve 9 during the all-cylinder operation in a normal state. After Step S8, the routine proceeds to Step S9. On the other hand, when the determination result in Step S7 is NO, i.e., the operating range is not the specific range C, the routine proceeds to Step S9 without changing the valve closing timing of the exhaust valve 9.

In Step S9, it is determined whether or not the intake air amount has reached the intake air amount during the reduced-cylinder operation. When the determination result in Step S9 is YES, the routine proceeds to Step S11. On the other hand, when the determination result in Step S9 is NO, i.e., the intake air amount does not reach the intake air amount during the reduced-cylinder operation, the routine proceeds to Step S10, and it is determined whether or not the time period when the ignition timing is set to the second retard limit is continued for the predetermined time period.

When the determination result in Step S10 is YES, i.e., the time period when the ignition timing is set to the second retard limit is continued for the predetermined time period, the routine proceeds to Step S11. On the other hand, when the determination result in Step S10 is NO, the routine returns to Step S5, and the routine repeats from Step S5 to Step S10.

In Step S11, the reduced-cylinder operation is started. Specifically, when the intake air amount has reached the intake air amount during the reduced-cylinder operation (YES in Step S9), or a time period when the ignition timing is set to the second retard limit is continued for the predetermined time, period (YES in Step S10), the reduced-cylinder operation is started, ignition and fuel injection of the deactivated cylinders (first and fourth cylinders 2A and 2D) are stopped, the valve-deactivation solenoid valves 42 are set to the ON-state, the intake valves 8 and the exhaust valves 9 of the deactivated, cylinders (first and fourth cylinders 2A and 2D) are kept in the closed state, and ignition control of the activated cylinders (second and third cylinders 2B and 2C) is switched to the control during the reduced-cylinder operation in a normal state. Further, when the valve closing timing of the exhaust valve 9 is controlled to be shifted toward the advance side in Step S8, the control is stopped, and the control is switched to the control during the reduced-cylinder operation in a normal state.

(5) Functions, Etc.

(i) Switching in Range other than Specific Range C

FIG. 10 illustrates a result when the control in the embodiment is executed, specifically, a result when the switching demand for switching from the all-cylinder operation to the reduced-cylinder operation is issued in an operating range other than the specific range C. FIG. 11 and FIG. 12 illustrate, as comparative examples, results when the preparatory control is not executed when the switching demand is issued in an operating range other than the Specific range C. FIG. 11 illustrates a result when the reduced-cylinder operation is started immediately after issuance of the switching demand. FIG. 12 illustrates a result when a control of retarding the ignition timing in the preparatory control is not executed at the time of switching from the all-cylinder operation to the reduced-cylinder operation. In each of the drawings, the uppermost graph illustrates a change in flag indicative of the switching demand for switching from the all-cylinder operation to the reduced-cylinder operation. When the switching demand for switching from the all-cylinder operation to the reduced-cylinder operation is issued, the flag is changed from 0 to 1.

As illustrated in FIG. 11, at the time t1 when combustion of the deactivated cylinders (first and fourth cylinders 2A and 2D) is stopped immediately after issuance of the switching demand for switching from the all-cylinder operation to the reduced-cylinder operation, and the activated cylinders are 2 cylinders, the throttle valve 34a is shifted toward the fully-open side accompanied by start of the reduced-cylinder operation, but fee intake air amount (per-cylinder intake air amount, charging, efficiency) does not immediately increase to the amount during the reduced-cylinder operation. As a result, due to the shortage in intake air amount of the activated cylinders (second and third cylinders 2B and 2C), it is impossible to secure power output from the activated cylinders, which may rapidly lower engine torque, and cause torque shock.

Further, as illustrated in FIG. 12, at the time t1, after issuance of the switching demand for switching from the all-cylinder operation to the reduced-cylinder operation, when the throttle valve 34a is shifted toward the fully-open side to increase the intake air amount (per-cylinder intake air amount, charging efficiency) to the amount during the reduced-cylinder operation, without instantaneously stopping combustion of the deactivated cylinders (first and fourth cylinders 2A and 2D), and then the reduced-cylinder operation is started, although lowering of engine torque is avoided, the intake air amount in all the cylinders increases in a state that combustion is performed in all the cylinders, lifts may increase power output in each of the cylinders, and may increase engine torque. Thus, even in this case, at the time t2 when the reduced-cylinder operation is started, engine torque may be rapidly lowered, and torque shock may occur.

In contrast, in the apparatus in the embodiment, as illustrated in FIG. 10, in addition to the control such that, after issuance of the switching demand for switching from the all-cylinder operation to the reduced-cylinder operation at the time t1, the throttle valve 34a is shifted toward the fully-open side to increase the intake air amount (per-cylinder intake air amount, charging efficiency) to the amount during the reduced-cylinder operation without instantaneously stopping combustion of the deactivated cylinders (first and fourth, cylinders 2A and 2D), the ignition timing is retarded according to an increment in intake air amount. This makes it possible to avoid an increase in power output in each of the cylinders, while increasing the intake air amount, and to avoid an increase or a decrease in engine torque. Specifically, it is possible to keep engine torque substantially constant at the time of switching from the all-cylinder operation to the reduced-cylinder operation. Thus, it is possible to avoid occurrence of torque shock at the time of the switching operation.

(ii) Switching in Specific Range C

FIG. 13 illustrates a result when the control in the embodiment is executed, specifically, a result at the time of issuance of the switching demand for switching from the all-cylinder operation to the reduced-cylinder operation in the specific range C. Further, FIG. 14 illustrates, as a comparative example, a result when the valve closing timing of the exhaust valve 9 is not changed in response to the switching demand in the operating range i.e. in the specific range C.

As mentioned above, in the specific range C, the torque-down rate is smaller than a predetermined value. Therefore, as illustrated in FIG. 14, after issuance of the switching demand for switching from the all-cylinder operation to the reduced-cylinder operation at the time t1, if the throttle valve 34a is shifted toward the fully-open side to increase the intake air amount (per-cylinder intake air amount, charging efficiency) without changing the valve closing timing of the exhaust, valve 9 while retarding the ignition timing, at a point of time when the ignition timing is retarded than a predetermined timing, combustion may become unstable, misfire may occur, and engine torque may vary. Further, in an attempt to avoid occurrence of misfire or the like, as illustrated by the broken line in FIG. 14, fixing the ignition timing at a limit timing free of occurrence of misfire may increase engine torque accompanied by an increase in intake air amount. This may cause torque shock at the time of start of the reduced-cylinder operation.

In contrast, as illustrated in FIG. 13, in the embodiment, at the time of switching operation in the specific range C, the valve closing timing of the exhaust valve 9 is advanced to enhance combustion stability while retarding the ignition timing. This makes it possible to sufficiently retard the ignition timing without causing misfire. Thus, it is possible to start the reduced-cylinder operation while avoiding variation of engine torque i.e. occurrence of torque shock. Further, reducing the amount of internal EGR gas accompanied by advancing the valve closing timing of the exhaust valve 9 makes it possible to increase the amount of fresh air (amount of air, intake air amount), and makes it possible to switch the engine to the reduced-cylinder cylinder operation at an early stage. For example, it is possible to start the reduced-cylinder operation at the time 112, which is earlier than the reduced-cylinder operation start time t2 in the example illustrated in FIG. 13.

As mentioned above, the apparatus in the embodiment is advantageous in securely avoiding occurrence of torque shock at the time of switching from the all-cylinder operation to the reduced-cylinder operation, and in securing good riding comfort.

(6) Modifications

In the embodiment, the valve closing timing of the exhaust valve 9 is advanced only when the switching demand for switching from the all-cylinder operation to the reduced-cylinder operation is issued in the specific range C. Alternatively, it is possible to advance the valve closing timing of the exhaust valve 9 any time during the switching operation without depending on the operating range.

It should be noted, however, advancing the valve closing timing of the exhaust valve 9 only in an operating condition in which misfire is highly likely to occur when the ignition timing is retarded in order to avoid an increase in engine torque makes it possible to avoid deterioration of emission performance accompanied by a decrease in internal EGR gas caused by advancing of the valve closing timing of the exhaust valve 9 in an operating condition other than the aforementioned operating condition, while avoiding occurrence of misfire in the aforementioned operating condition.

Further, in the embodiment, the specific range C is a range in which the torque-down rate is smaller than a predetermined value. The setting parameter of the specific range C is not limited to the above. For example, the specific range C may be a range in which the torque-down rate is equal to or smaller than a value other than 0.5. Further, it is possible to use a probability, with which misfire does not occur when combustion is performed in a certain condition a plural number of times, as an index of combustion stability in place of using the degree of combustion stability, and to set the ignition timing at which the probability reaches a predetermined value as the misfire limit timing for setting the torque-down rate, consequently, the specific range C.

In the embodiment, during execution of the preparatory control, the ignition timing is controlled not to be retarded than the predetermined second retard limit. Alternatively, it is possible to release the restraint regarding the ignition timing. Specifically, the retard amount of the ignition timing may be unlimitedly permitted during execution of the preparatory control. It should be noted, however, excessive retarding of the ignition timing may cause misfire or the like. In view of the above, setting the aforementioned restraint is advantageous in securely avoiding occurrence of misfire.

Further, in the embodiment, the second retard limit for the preparatory control is set on the retard side than the first retard limit in a normal state. Alternatively, it is possible to set the first retard limit and the second retard limit to a same value. It should be noted, however, setting the second retard limit for the preparatory control on the retard side than the first retard limit and allowing the ignition timing to be retarded during the preparatory control makes it possible to appropriately retard the ignition timing, taking into consideration an increase in intake, air amount, while avoiding occurrence of misfire or the like. This is advantageous in securely avoiding occurrence of torque shock.

Further, in the embodiment, determination as to whether or not the preparatory control is terminated and the reduced-cylinder operation is started is made based on whether or not the intake air amount reached the intake air amount during the reduced-cylinder operation, and based on whether or not a time period when the ignition timing reached the second retard limit is continued for a predetermined time period. The specific content on the determination is not limited to the above.

For example, the determination based on the ignition timing may be omitted. Further, the determination on the ignition timing may be made based on the premise that the preparatory control is terminated at a point of time when the ignition timing reached a predetermined limit timing, in place of performing the aforementioned determination. Specifically, in the embodiment, during the preparatory control, comparison is made between a timing set by retarding, by a time period corresponding an increment in intake amount, the basic ignition timing during the all-cylinder operation in a normal state, which is determined according to an operating condition, and the predetermined second retard limit; and a timing on the advance side out of these two timings is determined as the final ignition timing. Alternatively, it is possible to start the reduced-cylinder operation at a point of time when the timing retarded from the basic ignition timing reached the second retard limit.

Further, when determination is made based on whether or not the preparatory control is terminated and the reduced-cylinder operation is started on the basis of the intake air amount, in place of using the aforementioned determination parameter, it is possible to allow start of the reduced-cylinder operation at a point of time when a difference between the actual intake air amount and the intake air amount during the reduced-cylinder operation is equal to or smaller than a predetermined value. Further, during execution of the preparatory control, in place of performing the determination based on the intake air amount, it is possible to estimate, moment by moment, engine torque based on an assumption that the reduced-cylinder operation is started, and to determine that the preparatory control is terminated at a point of time when a difference between the estimated engine torque, and current engine torque i.e. engine torque demanded by the driver or the like is equal to or smaller than a predetermined value.

In the above embodiment, the control apparatus of the present invention is applied to a four-cylinder gasoline engine. A type of engine to which the control apparatus of the present invention is applicable is not limited to the above. For example, the control apparatus of the present invention may be applied to any multi-cylinder engine other than a four-cylinder engine, such as a six-cylinder or an eight-cylinder engine, and any other type of internal combustion engine, such as a diesel engine, an ethanol engine, and an LPG engine.

In the above embodiment, the throttle valve 34*a* and the valve actuator 34*b* are used as an intake air amount changing device capable of changing the intake air amount, which is the amount of air to be taken into each of the cylinders 2A to 2D. The intake air amount changing device is not limited to the above. For example, a device for changing the valve closing timing of the intake valve B may be provided, the device may be functioned as the intake air amount changing device, and the valve closing timing of the intake valve 8 may be changed for changing the intake air amount of each of the cylinders 2A to 2D. For example, in the embodiment, the intake VVT 28*a* for changing the valve closing timing of the intake valve 8 may be functioned as the intake air amount changing device, and the valve closing timing of the intake valve 8 may be advanced to increase the intake air amount.

(7) Summary of Embodiment

Lastly, the features of the embodiment and the modifications as disclosed above, and the advantageous effects thereof will be briefly described.

The engine control apparatus is an engine control apparatus provided with a plurality of cylinders including intake valves and exhaust valves, an ignition device provided in each of the cylinders and configured to apply ignition energy to an air-fuel mixture in the cylinders, and an intake air amount changing device capable of changing an amount of air to be taken into each of the cylinders. The apparatus is switchable between an all-cylinder operation in which combustion of the air-fuel-mixture is performed in all the cylinders, and a reduced-cylinder operation in which combustion in at least one of the cylinders is stopped and the at least one cylinder is deactivated. The apparatus includes a valve deactivation mechanism which switches the intake valve and the exhaust valve of the at least one cylinder between a state that the intake valve and the exhaust valve are openable and closable, and a state that the intake valve and the exhaust valve are kept closed; an exhaust valve closing timing changing device operable to change a valve closing timing of the exhaust valve; and a control device which controls components of an engine including the valve deactivation mechanism, the exhaust valve closing timing changing device, the intake air amount changing device, and the ignition device. The control device is operative to, in response to a switching demand for switching from the all-cylinder operation to the reduced-cylinder operation, execute a preparatory control of causing the intake air amount changing device to make an amount of air to be taken into each of the cylinders larger than an amount of air during the all-cylinder operation in a normal state in which the switching demand is not issued, and of changing an ignition timing, of the ignition device to a timing on a retard side with respect to an ignition timing during the all-cylinder operation in the normal state; and after termination of the preparatory control, cause the valve deactivation mechanism to keep the intake valve and the exhaust valve of the at least one cylinder in a closed state, and to stop ignition of the ignition device of the at least one cylinder for starting the reduced cylinder operation. The control device is operative to, during execution of the preparatory control, cause the exhaust valve closing timing changing device to change the valve closing timing of the exhaust valve to a timing on an advance side with respect to a valve closing timing of the exhaust valve during the all-cylinder operation in the normal state so as to reduce an amount of internal EGR gas remaining in each of the cylinders in at least a part of an operating range.

According to the aforementioned configuration, at the time of switching from the all-cylinder operation to the reduced-cylinder operation, before start of the reduced-cylinder operation, namely, before combustion in the at least one cylinder is stopped, the amount of air to be taken into each of the cylinders is increased. This makes it possible to secure the amount of air to be taken, into each of the activated cylinders at the time of start of the reduced-cylinder operation, and makes it possible to suppress lowering of power output of the activated cylinders i.e. lowering of engine torque at the time of start of the reduced-cylinder operation. Further, according to the invention, the ignition timing is changed to a timing on the retard side with respect to the ignition timing during the all-cylinder operation in the normal state, while increasing the amount of air to be taken into each of the cylinders as mentioned above. Thus, increasing the amount of air to be taken into each of the cylinders makes it possible to suppress an increase in engine torque. This makes it possible to securely avoid an increase or a decrease in engine torque, i.e. occurrence of torque shock before and after switching from the all-cylinder operation to the reduced-cylinder operation.

As mentioned above, when the ignition timing is shifted toward the retard side, an excessive increase in retard amount may make the combustion unstable and may cause misfire or the like. According to the invention, during the control of retarding the ignition timing as mentioned above (during execution of the preparatory control), the valve closing timing of the exhaust valve is shifted toward the advance side to reduce the amount of internal EGR gas. This makes it possible to enhance combustion stability during the control of retarding the ignition timing, and to avoid occurrence of misfire or the like caused by retarding of the ignition timing. This is advantageous in securing good riding comfort.

In the aforementioned configuration, preferably, the control device may be operative to terminate the preparatory control and start the reduced-cylinder operation when the ignition timing is on the retard side than a predetermined limit timing during execution of the preparatory control.

The aforementioned configuration makes it possible to avoid excessive retard of the ignition timing, and makes it possible to securely avoid occurrence of misfire or the like accompanied by shifting the ignition timing toward the retard side.

Further, in the aforementioned configuration, preferably, the control device may be operative to inhibit the ignition timing from retarding than a predetermined first retard limit during a normal operation when the preparatory control is not executed, and inhibit the ignition timing from retarding than a predetermined second retard limit during execution of the preparatory control, wherein the second retard limit is a timing on the retard side with respect to the first retard limit.

According to the aforementioned configuration, during the normal operation, it is possible to avoid occurrence of misfire or the like due to setting of the ignition timing on the retard side with respect to a predetermined limit timing. During execution of the preparatory control, it is possible to cancel an increase in engine torque caused by an increase in the amount of air by further shifting of the ignition timing toward the retard side. Before and after switching from the all-cylinder operation to the reduced-cylinder operation, it is possible to securely avoid occurrence of torque shock.

The invention claimed is:

1. An engine control apparatus provided with a plurality of cylinders including intake valves and exhaust valves, an ignition device provided in each of the cylinders and configured to apply ignition energy to an air-fuel mixture in the cylinders, and an intake air amount changing device capable of changing an amount of air to be taken into each of the cylinders, the apparatus being switchable between an all-cylinder operation in which combustion of the air-fuel-mixture is performed in all the cylinders, and a reduced-cylinder operation in which combustion in at least one of the cylinders is stopped and the at least one cylinder is deactivated, the apparatus comprising:

a valve deactivation mechanism which switches the intake valve and the exhaust valve of the at least one cylinder between a state that the intake valve and the exhaust valve are openable and closable, and a state that the intake valve and the exhaust valve are kept closed;

an exhaust valve closing timing changing device operable to change a valve closing timing of the exhaust valve; and a control device configured to control components of an engine including the valve deactivation mechanism, the exhaust valve closing timing changing device, the intake air amount changing device, and the ignition device, wherein the control device is configured to:

in response to a switching demand for switching from the all-cylinder operation to the reduced-cylinder operation, execute a preparatory control of causing the intake air amount changing device to make an amount of air to be taken into each of the cylinders larger than an amount of air during the all-cylinder operation in a normal state in which the switching demand is not issued, and of changing an ignition timing of the ignition device to a timing on a retard side with respect to an ignition timing during the all-cylinder operation in the normal state; and after termination of the preparatory control, cause the valve deactivation mechanism to keep the intake valve and the exhaust valve of the at least one cylinder in a closed state, and to stop ignition of the ignition device of the at least one cylinder for starting the reduced cylinder operation, and during execution of the preparatory control, cause the exhaust valve closing timing changing device to change the valve closing timing of the exhaust valve to a timing on an advance side with respect to a valve closing timing of the exhaust valve during the all-cylinder operation in the normal state so as to reduce an amount of internal EGR gas remaining in each of the cylinders in at least a part of an operating range.

2. The engine control apparatus according to claim 1, wherein the control device is configured to terminate the preparatory control and start the reduced-cylinder operation when the ignition timing is on the retard side with respect to a predetermined limit timing during execution of the preparatory control.

3. The engine control apparatus according to claim 1, wherein the control device is configured to: inhibit the ignition timing from retarding than a predetermined first retard limit during a normal operation when the preparatory control is not executed; and inhibit the ignition timing from retarding than a predetermined second retard limit during execution of the preparatory control, the second retard limit being a timing on the retard side with respect to the first retard limit.

4. An engine control apparatus provided with a plurality of cylinders including intake valves and exhaust valves, an ignition device provided in each of the cylinders and configured to apply ignition energy to an air-fuel mixture in the cylinders, and an intake air amount changing device capable of changing an amount of air to be taken into each of the cylinders, the apparatus being switchable between an all-cylinder operation in which combustion of the air-fuel-mixture is performed in all the cylinders, and a reduced-cylinder operation in which combustion in at least one of the cylinders is stopped and the at least one cylinder is deactivated, the apparatus comprising:

a valve deactivation mechanism which switches the intake valve and the exhaust valve of the at least one cylinder between a state that the intake valve and the exhaust valve are openable and closable, and a state that the intake valve and the exhaust valve are kept closed;

an exhaust valve closing timing changing device operable to change a valve closing timing of the exhaust valve; and a control device configured to control components of an engine including the valve deactivation mechanism, the exhaust valve closing timing changing device, the intake air amount changing device, and the ignition device, wherein the control device is configured to:

in response to a switching demand for switching from the all-cylinder operation to the reduced-cylinder operation, execute a preparatory control of causing the intake air amount changing device to make an amount of air to be taken into each of the cylinders larger than an amount of air during the all-cylinder operation in a normal state in which the switching demand is not issued, and of changing an ignition timing of the ignition device to a timing on a retard side with respect to an ignition timing during the all-cylinder operation in the normal state; and after termination of the preparatory control, cause the valve deactivation mechanism to keep the intake valve and the exhaust valve of the at least one cylinder in a closed state, and to stop ignition of the ignition device of the at least one cylinder for starting the reduced cylinder operation, and a specific operating range judging device judge a result at the time of issuance of the switching demand for switching from the all-cylinder operation to the reduced-cylinder operation in a specific range C, that is the ignition timing may exceed a misfire limit timing, or not, and in case the specific operation range judging device judges that the result is in the specific range C, during execution of the preparatory control, cause the exhaust valve closing timing changing device to change the valve closing timing of the exhaust valve to a timing on an advance side with respect to a valve closing timing of the exhaust valve during the all-cylinder operation in the normal state so as to reduce an amount of internal EGR gas remaining in each of the cylinders in at least a part of an operating range.

5. The engine control apparatus of claim 1, in case the specific operating range judging device judges that the result is not in the specific range C, during execution of the preparatory control, causes the exhaust valve closing timing changing device not to change the valve closing timing of the exhaust valve.

6. An engine control apparatus provided with a plurality of cylinders including intake valves and exhaust valves, an ignition device provided in each of the cylinders and configured to apply ignition energy to an air-fuel mixture in the cylinders, and an intake air amount changing device capable of changing an amount of air to be taken into each of the cylinders, the apparatus being switchable between an all-cylinder operation in which combustion of the air-fuel-mixture is performed in all the cylinders, and a reduced-cylinder operation in which combustion in at least one of the cylinders is stopped and the at least one cylinder is deactivated, the apparatus comprising:

a valve deactivation mechanism that switches the intake valve and the exhaust valve of the at least one cylinder between a state that the intake valve and the exhaust valve are openable and closable, and a state that the intake valve and the exhaust valve are kept closed;

an exhaust valve closing timing changing device operable to change a valve closing timing of the exhaust valve; and a control device configured to control components of an engine including the valve deactivation mechanism, the exhaust valve closing timing changing device, the intake air amount changing device, and the ignition device, wherein the control device is configured to:

in response to a switching demand for switching from the all-cylinder operation to the reduced-cylinder operation, execute a preparatory control of causing the intake air amount changing device to make an amount of air to be taken into each of the cylinders larger than an amount of air during the all-cylinder operation in a normal state in which the switching demand is not issued, and of changing an ignition timing of the ignition device to a timing on a retard side with respect to an ignition timing during the all-cylinder operation in the normal state; and after termination of the preparatory control, cause the valve deactivation mechanism to keep the intake valve and the exhaust valve of the at least one cylinder in a closed state, and to stop ignition of the ignition device of the at least one cylinder for starting the reduced cylinder operation, during execution of the preparatory control, cause the exhaust valve closing timing changing device to change the valve closing timing of the exhaust valve to a timing on an advance side with respect to a valve closing timing of the exhaust valve during the all-cylinder operation in the normal state so as to reduce an amount of internal EGR gas remaining in each of the cylinders in at least a part of an operating range, and after termination of the preparatory control, cause the exhaust valve closing timing changing device to change the valve closing timing of the exhaust valve to a timing on a retard side.

\* \* \* \* \*